US012125655B2

(12) United States Patent
Ge et al.

(10) Patent No.: US 12,125,655 B2
(45) Date of Patent: Oct. 22, 2024

(54) PLUG-IN CIRCUIT BREAKER

(71) Applicant: ZHEJIANG CHINT ELECTRICS CO., LTD., Zhejiang (CN)

(72) Inventors: Weijun Ge, Zhejiang (CN); Kejun Lu, Zhejiang (CN); Xiangyi Gu, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 206 days.

(21) Appl. No.: 17/776,151

(22) PCT Filed: Nov. 14, 2020

(86) PCT No.: PCT/CN2020/128876

§ 371 (c)(1),
(2) Date: May 11, 2022

(87) PCT Pub. No.: WO2021/093877

PCT Pub. Date: May 20, 2021

(65) Prior Publication Data

US 2022/0384133 A1 Dec. 1, 2022

(30) Foreign Application Priority Data

Nov. 15, 2019 (CN) ......................... 201911122582.X

(51) Int. Cl.
*H01H 71/58* (2006.01)
*H01H 71/10* (2006.01)
*H01R 13/641* (2006.01)

(52) U.S. Cl.
CPC ........ *H01H 71/1009* (2013.01); *H01H 71/58* (2013.01); *H01R 13/641* (2013.01)

(58) Field of Classification Search
CPC ...... H01H 71/1009; H01H 71/58; H01H 9/08; H01H 71/08; H01H 71/505;
(Continued)

(56) References Cited

U.S. PATENT DOCUMENTS 5,912,604 A * 6/1999 Harvey .............. H01H 33/6662 218/138
6,107,902 A * 8/2000 Zhang .................... H01H 71/04 335/8

(Continued)

FOREIGN PATENT DOCUMENTS

CN 106710982 A 5/2017
CN 107833799 A 3/2018

(Continued)

OTHER PUBLICATIONS

International Search Report mailed Feb. 20, 2021 in corresponding PCT International Application No. PCT/CN2020/128876.

(Continued)

*Primary Examiner* — Shawki S Ismail
*Assistant Examiner* — Lisa N Homza
(74) *Attorney, Agent, or Firm* — OSTROLENK FABER LLP

(57) ABSTRACT

A plug-in circuit breaker with an operating button that includes a button inner end inserted inside the circuit breaker and a button outer end. An indicator slot is arranged inside the operating button, an indicating hole is arranged on the button outer end. The plug-in circuit breaker further includes
(Continued)

an indicating member slidably inserted inside the indicator slot and one end of which is provided with a make-contact indicating surface and a break-contact indicating surface. When the plug-in circuit breaker is in a break-contact state, the break-contact indicating surface is arranged opposite to the indicating hole, thus during pressing the operating button, the indicating member moves inside the indicator slot. After the make-contact state, the make-contact indicating surface is arranged opposite to the indicating hole. The indicating member is arranged inside the operating button to save space and to indicate the break-contact and make-contact state through the indicating hole.

15 Claims, 14 Drawing Sheets

(58) Field of Classification Search
CPC .. H01H 2071/046; H01H 71/04; H01H 73/08; H01R 13/641
USPC ............................................................ 335/9
See application file for complete search history.

(56) References Cited

U.S. PATENT DOCUMENTS

| | | | | |
|---|---|---|---|---|
| 6,353,377 B1 * | 3/2002 | Palmer | H01H 71/24 | 335/9 |
| 7,586,395 B2 * | 9/2009 | Weister | H01H 71/0207 | 361/45 |
| 2006/0250200 A1 * | 11/2006 | Babu | H01H 71/505 | 335/6 |

FOREIGN PATENT DOCUMENTS

| | | |
|---|---|---|
| CN | 207624637 U | 7/2018 |
| CN | 108461357 A | 8/2018 |
| CN | 108511278 A | 9/2018 |
| CN | 208521876 U | 2/2019 |
| CN | 110400727 A | 11/2019 |
| CN | 111477507 A | 7/2020 |

OTHER PUBLICATIONS

Written Opinion mailed Feb. 20, 2021 in corresponding PCT International Application No. PCT/CN2020/128876.

* cited by examiner

PLUG-IN CIRCUIT BREAKER

CROSS-REFERENCE TO RELATED APPLICATIONS

The present application is a 35 U.S.C. §§ 371 national stage application of International Application No. PCT/CN2020/128876, filed Nov. 14, 2020, which claims priority to Chinese Patent Application No. 201911122582.X, filed Nov. 15, 2019, the contents of both of which are incorporated herein by reference.

FIELD OF THE INVENTION

The invention relates to the field of low-voltage electrical appliances, in particular to a plug-in circuit breaker.

BACKGROUND OF THE INVENTION

With the rapid development of the network communication technology, especially the application and popularization of 5G networks, as plug-in circuit breakers enable easy installation and deinstallation inside the cabinet in a plug-in and plug-out mode, such circuit breakers are increasingly preferred by the market. Compared with common terminal circuit breakers, the plug-in circuit breakers provide new special use conditions, such as their connection with a power supply circuit capable of convenient plug-in and plug-out operations like known universal plug products, and also have a safety locking function necessary to ensure deenergized plug-in and plug-out operations (the circuit breaker cannot be plugged and plucked in a make-contact state). In order to achieve the above special use conditions, the plug-in circuit breakers need to supplement an indicating apparatus capable of strikingly and accurately distinguishing the break-contact and make-contact state of the circuit breaker, and a locking apparatus capable of preventing the plug-in and plug-out operation for make-contact, so as to ensure the safety of powered devices and operators, and improve the safety level of circuit breaker products. However, in the plug-in circuit breaker used in the communication industry, in addition to an operating button required be arranged and used for the break-contact and make-contact operation within the end panel space with a IU height, there is also a wiring mechanism required to arrange a wire-outlet end, so there is no redundant space for arranging the indicating apparatus suitable for break-contact and make-contact. During distinguishing the break-contact and make-contact state of the circuit breaker only by the position of the operating button, uses and maintainers can not easily recognized it in use, thereby causing an energized operation hazard.

The Chinese utility model CN208521876U discloses a break-contact and make-contact indicating apparatus of a circuit breaker operating device, wherein the indicating member adopts a swinging type structure, and the display surface of the indicating member is arranged at the end of a display handle away from a left wing stand, a right wing stand and a mounting rotation shaft. Therefore, of the indicating member, and the button and the circuit breaker housing assembled with it, the processing error will amplify the position error of the movement of the display surface, thereby causing the problem, such as poor position accuracy of the display surface (including the repetition precision) and poor movement stability, and increased assembly difficulty, so the control to the fit clearance between the display surface and the observation window can not reach the ideal minimization, furthermore such fit clearance is directly related to the observation effect, and even affects the quality of products. The indicating apparatus of this patent needs to occupy a larger internal space because of its installation inside the circuit breaker in a stand-alone configuration.

The Chinese utility model CN207624637U discloses a plug-in circuit breaker, comprising a respective independent locking apparatus, a fixing mechanism, an unlocking mechanism and an indicator, wherein there is no direct connecting, driving or linkage relation with each other, so such structure is complex and occupies a large internal space of the circuit breaker. Moreover, due to the fact that one locking stand is always required to be inserted into the receiver cabinet during the plug-in and plug-out operation and operating process of the circuit breaker, the friction force generated under the pressure of the cabinet must hinder plugging and plucking the circuit breaker, so that there is hardness of plugging and plucking as well as unavoidableness of the safety risk caused by recklessly plugging the circuit breaker.

SUMMARY OF THE INVENTION

The present invention aims to overcome the defects in the prior art, and to provide a plug-in circuit breaker with an indicating member arranged inside an operating button, thereby saving the internal assembly space of the circuit breaker housing, and the indicating member can intuitively indicate the break-contact and make-contact state of the plug-in circuit breaker through an indicating hole, thereby facilitating observation.

A plug-in circuit breaker comprising a circuit breaker housing and an operating button 1*d*, one end of the operating button 1*d* inserted inside the circuit breaker housing being a button inner end, and the other end of the operating button 1*d* protruding outside the circuit breaker housing being a button outer end;

an indicator slot is arranged inside the operating button 1*d*, an indicating hole 12*d* is arranged on the button outer end, and the indicating hole 12*d* communicates with the indicator slot; the plug-in circuit breaker further includes an indicating member 7, one end of which is provided with a make-contact indicating surface 70 and a break-contact indicating surface 71 both respectively fitting with the indicating hole 12*d;* when the plug-in circuit breaker is in a break-contact state, the break-contact indicating surface 71 is arranged opposite to the indicating hole 12*d*, thus during pressing the operating button 1*d* to move it toward the make-contact position, the indicating member 7 moves inside the indicator slot, after the plug-in circuit breaker enters the make-contact state, the make-contact indicating surface 70 is arranged opposite to the indicating hole 12*d*, thus during pulling the operating button 1*d* to move it toward the break-contact position, the indicating member 7 moves inside the indicator slot, after the plug-in circuit breaker enters the break-contact state, the break-contact indicating surface 71 is arranged opposite to the indicating hole 12*d.*

Preferably, the movement direction of the operating button 1*d* is perpendicular to the movement direction of the indicating member 7 within the indicator slot.

Preferably, an indicator tracking shaft 75 is arranged on the indicating member 7, an indicator tracking groove is arranged on the circuit breaker housing, the indicator tracking groove is an oblique tracking groove, the indicator tracking shaft 75 is slidably arranged in the indicator tracking groove; when pressing/pulling the operating button 1*d*, the indicator tracking groove drives the indicating member 7 to move in its entirety in the indicator slot by the indicator tracking shaft 75, so that the make-contact indicating surface 70/break-contact indicating surface 71 is arranged opposite to the indicating hole 12*d*.

Preferably, the operating button 1*d* further includes an indicator sliding groove 100*d* respectively arranged on a pair of side walls of the indicator slot, the extension direction of the indicator sliding groove 100*d* is perpendicular to the movement direction of the operating button 1*d*; the indicating member 7 further includes two indicator sliding stands 72 respectively arranged on a pair of side surfaces thereof, the indicator sliding stands 72 are slidably arranged in the indicator sliding grooves 100*d*.

Preferably, the indicator tracking groove is formed by means of the fit between two inclined half-grooves arranged opposite to each other on the circuit breaker housing; when the plug-in circuit breaker is in the break-contact state, the indicator tracking shaft 75 is positioned at one end of the indicator tracking groove, which is a first tracking groove end; when the plug-in circuit breaker is in the make-contact state, the indicator tracking shaft 75 is positioned at the other end of the indicator tracking groove, which is a second tracking groove end, the first tracking groove end is closer to the button outer end of the operating button 1*d* than the second tracking groove end.

Preferably, the plug-in circuit breaker further includes a locking mechanism, the locking mechanism includes a second locking member 8 pivotally arranged, the second locking member 8 includes a locking member upper end and a locking member lower end respectively arranged at both ends thereof; the locking member lower end is provided with a second protrusion 82; when the plug-in circuit breaker is in the make-contact state, the operating button 1*d* actuates the second locking member 8 to rotate by the locking member lower end, so that the second protrusion 82 protrudes outside the circuit breaker housing; when the plug-in circuit breaker is in the break-contact state, the operating button 1*d* actuates the second locking member 8 to rotate by the locking member upper end, so that the second protrusion 82 moves into the circuit breaker housing.

Preferably, the indicating member 7 further includes an indicator horizontal arm 74 arranged at one end thereof, the second locking member 8 further includes a second locking member activated portion 81 arranged at the locking member upper end, the operating button 1*d* are drivingly cooperated with the second locking member activated portion 81 by the indicator horizontal arm 74 to drive the second locking member 8 to rotate, so that the second protrusion 82 moves into the circuit breaker housing.

Preferably, the second locking member 8 further includes a second locking member activated protrusion 83 arranged at the locking member lower end, the second locking member activated protrusion 83 protudes in the reverse direction of the second protrusion 82; when the plug-in circuit breaker is in the make-contact state, the indicator horizontal arm 74 is positioned on one side of the second locking member activated protrusion 83 and in limit fit with it, so as to keep the second protrusion 82 protruding outside the circuit breaker housing.

Preferably, the locking mechanism further includes a first locking member 9, which has one end slidably arranged inside the circuit breaker housing, and the other end being a first protrusion 90 protuding outside the circuit breaker housing; when the plug-in circuit breaker is assembled to a cavitated circuit breaker assembling position, the housing of the circuit breaker assembling position presses the first protrusion 90, so that the first locking member 9 moves in its entirety to the inside of the circuit breaker housing, after the plug-in circuit breaker has been assembled to reach the designated positionin, the first protrusion 90 protrudes outside the circuit breaker housing and is in limit fit with the housing of the circuit breaker assembling position.

Preferably, the locking member lower end of the second locking member 8 is drivingly cooperated with the first locking member 9, when the plug-in circuit breaker is in the break-contact state, pulling the operating button 1*d* actuates the first locking member 9 to move in its entirety toward the inside of the circuit breaker housing by the second locking member 8, so as to release the limit fit between the first protrusion 90 and the housing of the circuit breaker assembling position.

Preferably, the first locking member 9 further includes a first sliding end 90*a* slidably arranged inside the circuit breaker housing, the first sliding end 90*a* has one side connected with the first protrusion 90, and the other side connected with the circuit breaker housing by the first locking member resetting spring 9*a* applying a force to the first locking member 9 to keep the first protrusion 90 protruding outside the circuit breaker housing.

Preferably, the first sliding end 90*a* further includes a first activated protrusion 91 and a second activated protrusion 94, the second locking member 8 further includes a second locking member body 84 pivotally arranged in the middle, the second locking member activated portion 81 of the second locking member 8 is crookedly connected with one end of the second locking member body 84, and the other end of the second locking member body 84 is provided with the second protrusion 82 and drivingly cooperated with the second activated protrusion 94, the second locking member activated portion 81 and the second protrusion 82 protrude toward the both sides of the second locking member body 84, respectively, and the second protrusion 82 is drivingly cooperated with the first activated protrusion 91.

Preferably, the indicating member 7 includes an indicator body 7-0, an indicator horizontal arm 74, an indicator tracking shaft 75, an indicator sliding stand 72, a make-contact indicating surface 70 and a break-contact indicating surface 71; the indicator horizontal arm 74 and indicator tracking shaft 75 are arranged on the identical end of the indicator body 7-0 and positioned on the both sides of the indicator body 7-0, respectively, the indicator horizontal arm 74 is crookedly connected with the indicator body 7-0, the make-contact indicating surface 70 and the break-contact indicating surface 71 are arranged side by side on the other end of the indicator body 7-0, two indicator sliding stands 72 are respectively arranged on both sides of the middle part of the indicator body 7-0.

Preferably, the indicating member 7 further includes an indicator vertical arm 73, the indicator vertical arm 73 and the indicator horizontal arm 74 are connected with each other and have a L-shaped structure in their entirety.

Preferably, the second locking member 8 includes a second locking member activated portion 81, a second locking member body 84, a second locking member activated protrusion 83, a second locking member activated protrusion 83 and a second protrusions 82; the second locking member body 84 has the middle part pivotally arranged on the circuit breaker housing by the second locking member mounting shaft 80, one end crookedly connected with the second locking member activated portion 81, and the other end provided with the second locking member activated protrusion 83 and the second protrusions 82, the second locking member activated portion 81 and the second protrusion 82 protrude toward both sides of the second locking member body 84, respectively, and the second locking member activated portion 81 and the second locking member activated protrusion 83 both protrude on the identical side of the second locking member body 84.

Preferably, the first locking member 9 further includes a first sliding end 90*a* and a first protrusion 90 respectively arranged both end thereof, the first sliding end 90*a* has one side connected with the first protrusion 90, and the other side connected with the circuit breaker housing by the first locking member resetting spring 9*a*; one end of the first sliding end 90*a* is provided with a first tracking groove 93 fitting with a first sliding track on the circuit breaker housing; the first sliding end 90*a* further includes a first activated protrusion 91 and a second activated protrusion 94, the first activated protrusion 91 and the first tracking groove 93 are respectively arranged at both ends of the first sliding end 90*a*, the second activated protrusion 94 are arranged on the upper side of the first sliding end 90*a* and positioned between the first activated protrusion 91 and the first tracking groove 93.

In the plug-in circuit breaker of the present invention, the indicating member is inserted into an indicator slot arranged inside the operating button with less occupied space, facilitating the design of miniaturizing the circuit breaker. The make-contact indicating surface and the break-contact indicating surface of the indicating member are arranged opposite to the indicating hole, respectively, so that users can intuitively observe through the indicating hole to quickly judge the make-contact/break-contact state of the circuit breaker. Moreover, the indicating member moves in its entirety in the indicator slot, so as to switch between the make-contact indicating surface and the break-contact indicating surface both displayed in the indicating hole.

In addition, the indicating member acts more accurately with minor error, thus the make-contact indicating surface or the break-contact indicating surface completely covers the indicating hole, avoiding both the make-contact indicating surface and the break-contact indicating surface from being displayed inside the indicating hole at the same time and resulting in occurrence of misjudgment by users, and facilitating improving the user's electrical safety.

Furthermore, the indicator sliding groove fits with the indicator sliding stand to limit the movement path of the indicating member and ensure the reliability of indication results.

DETAILED DESCRIPTION OF SOME EMBODIMENTS

Figure 1:
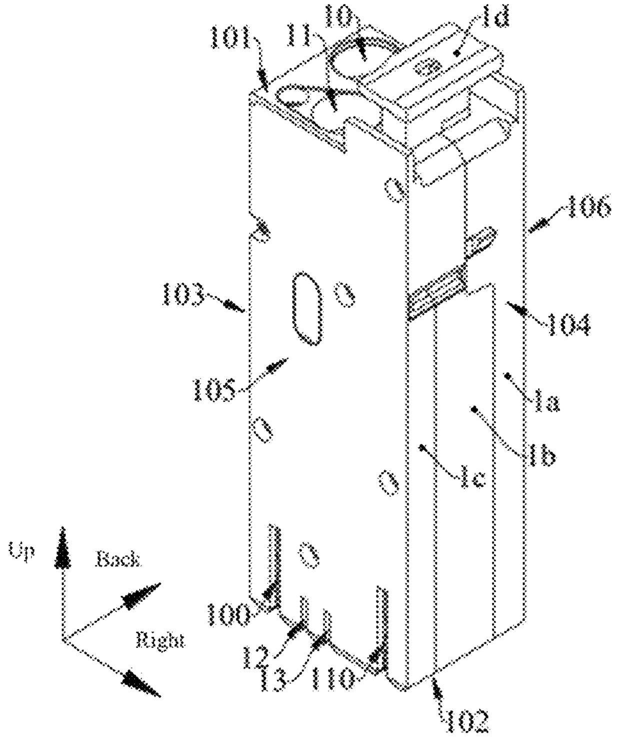
FIG. 1 is a structure view of the plug-in circuit breaker of the present invention, showing at least the appearance structure of the plug-in circuit breaker.

We further describe the embodiments of the plug-in circuit breaker according to the present invention as follows in combination with the examples shown in FIGS. 1-30. The plug-in circuit breaker of the present invention is not limited to the description of the following embodiments.

The plug-in circuit breaker of the present invention includes a circuit breaker housing and at least one protective pole, wherein the circuit breaker housing includes at least one protective pole-mounting cavity fitting with the protective pole by one-to-one, each protective pole includes the operating button 1*d*, the operating mechanism 3 arranged inside the protective pole-mounting cavity and drivingly connected with the operating button 1*d*, the protecting mechanism 4 drivingly cooperated with the operating mechanism 3, the arc extinguishing system 5, the first wire-inlet terminal 110, the first wire-outlet terminal 11, the movable contact 61 connected with the operating mechanism 3, and the stationary contact 62 fitting with the movable contact 61.

It should be pointed out that the plug-in circuit breaker of the present invention can be configured to be a single-pole circuit breaker (a circuit breaker only having one protective pole), or a two-pole circuit breaker with one protective pole, or a two-pole circuit breaker with two protective poles, or a three-pole circuit breaker with three protective poles, or a four-pole circuit breaker with three protective poles, or a four-pole circuit breaker with four protective poles.

Figure 2:
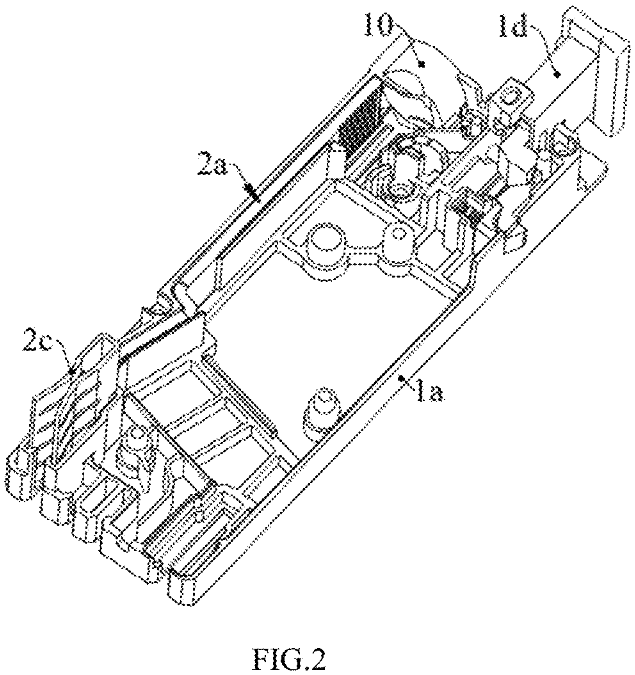
FIG. 2 is a structure view of the neutral pole of the plug-in circuit breaker of the present invention.
Figure 3:
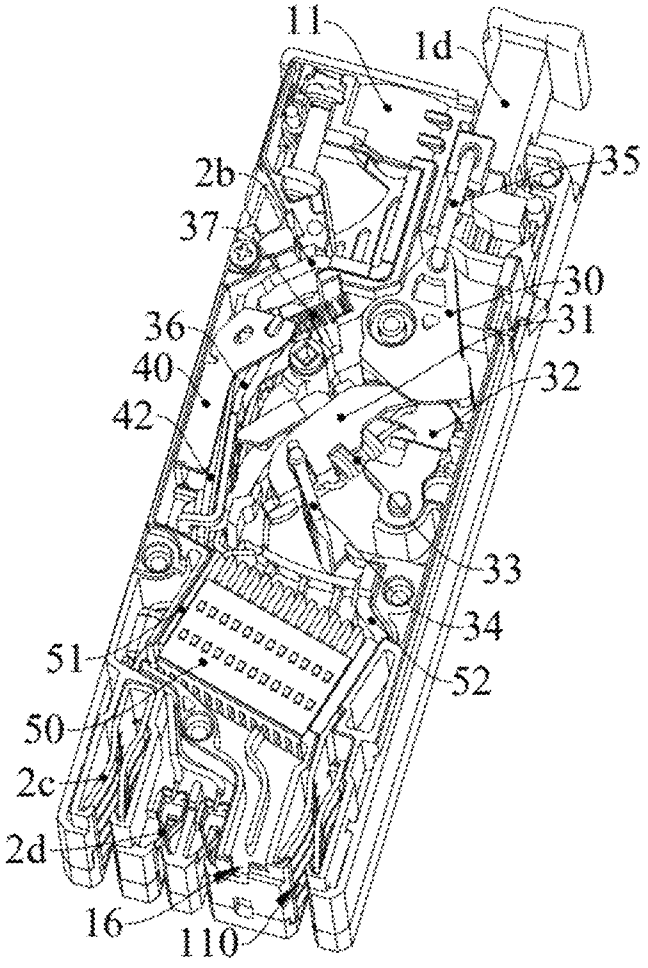
FIG. 3 is a structure view of the protective pole of the plug-in circuit breaker of the present invention.

Preferably, as shown in FIGS. 2 and 3, one end of the operating button 1*d* is inserted into the circuit breaker housing, said operating button 1*d* and said first wire-outlet terminal 11 are arranged at one end of the circuit breaker housing, and said first wire-inlet terminal 110 is arranged and at the other end of the circuit breaker housing. The arc extinguishing system 5 is arranged in the middle of the protective pole-mounting cavity and positioned on one side of the first wire-inlet terminal 110, the operating mechanism 3 is arranged between the operating button 1*d* and the arc extinguishing system 5, and the protecting mechanism 4 is arranged between the first wire-outlet terminal 11 and the arc extinguishing system 5 and positioned on one side of the operating mechanism 3. In the plug-in circuit breaker of the present invention, the arrangement of its protective pole is more compact, so it significantly reduces the volume of the plug-in circuit breaker and facilitates saving the internal space of communication cabinets in keeping with the development trend of miniaturizing communication cabinets. Specifically, in the direction shown in FIGS. 2-3, from left to right, the protecting mechanism 4 and the operating mechanism 3 are arranged side by side in the width direction of the circuit breaker housing, about ¼ of which is occupied by the protecting mechanism 4, and about ¼ of which is occupied by the operating mechanism 3; and the arc extinguishing system 5 is arranged below the protecting mechanism 4 and the operating mechanism 3, occupying about ⅗ of the width of the circuit breaker housing.

Figure 4:
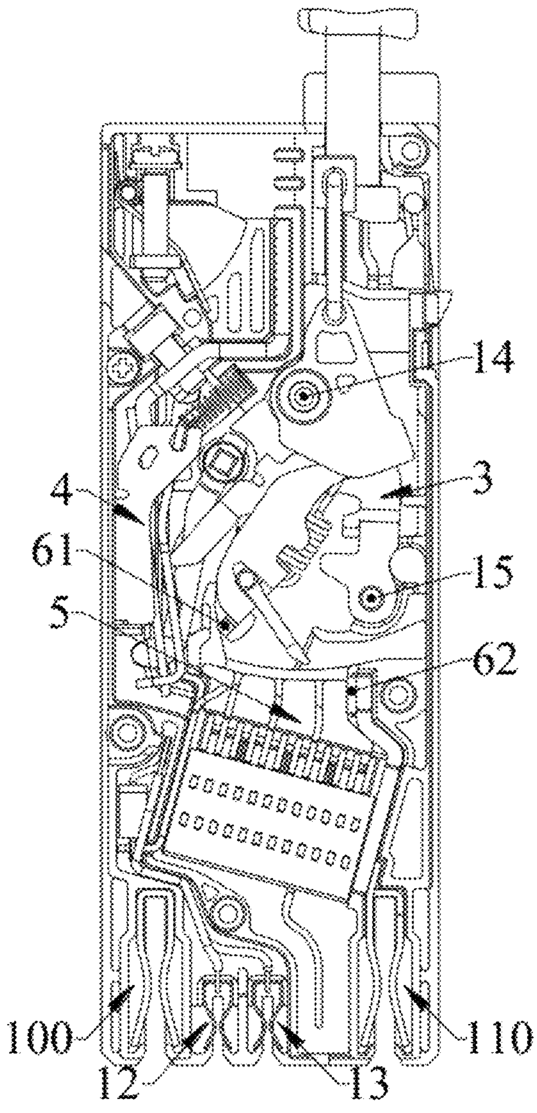
FIG. 4 is another structure view of the protective pole of the plug-in circuit breaker of the present invention.
Figure 5:
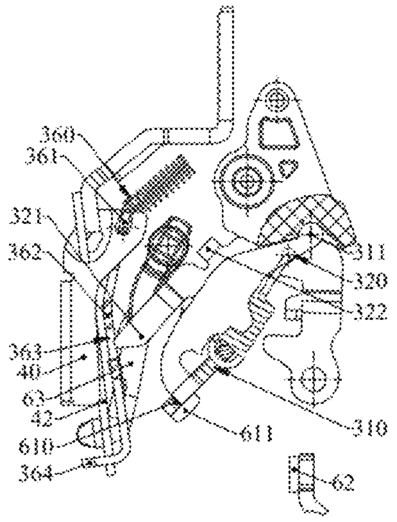
FIG. 5 is a structure view of the operating mechanism in the first embodiment of the present invention during the break-contact state of the plug-in circuit breaker.
Figure 6:
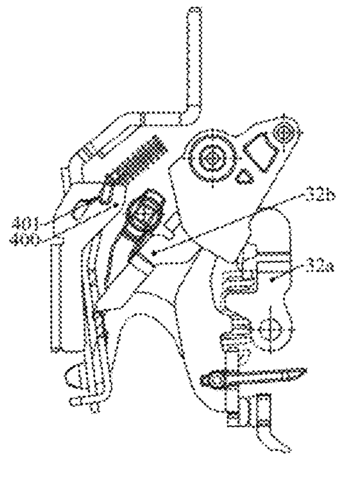
FIG. 6 is a structure view of the operating mechanism in the first embodiment of the present invention during the make-contact state of the plug-in circuit breaker.
Figure 7:
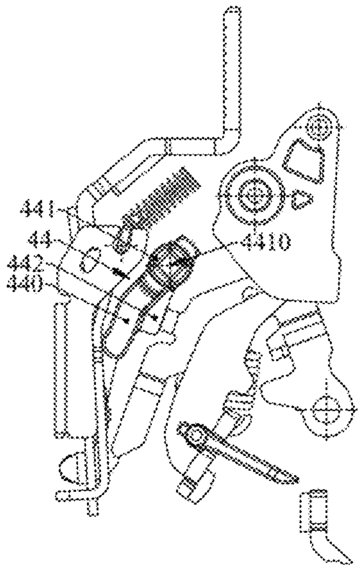
FIG. 7 is a structure view of the operating mechanism in the first embodiment of the present invention during the tripping state of the plug-in circuit breaker.

Preferably, as shown in FIG. 6, when the plug-in circuit breaker is in a make-contact state, and the operating mechanism 3 is in a locking state, thus a short-circuit fault or an overload fault occurs, at this time the protecting mechanism 4 actuates the operating mechanism 3 to trip off, then the plug-in circuit breaker trips and the operating mechanism 3 enters an unlocking state (as shown in FIG. 7), pulling the operating button 1*d* to move it toward the break-contact position actuates the operating mechanism 3 to return to the locking state, thus the plug-in circuit breaker enters the break-contact state (as shown in FIG. 5). Further, as shown in FIGS. 3-7, the operating mechanism 3 includes the U-shaped connecting rod 35, the operating handle 30, the contact supporting rod 31, the jump buckle 32, the lock catch 36, the lock catch-resetting spring 37 and the main tension spring 33. The operating handle 30 is pivotally arranged on the circuit breaker housing. One end of the operating handle 30 is drivingly connected with the operating button 1*d* by the U-shaped connecting rod 35, and the other end of the operating handle 30 is rotatably connected with one end of the contact supporting rod 31, the other end of which is provided with the movable contact 61. The jump buckle 32 has one end pivotally arranged on the circuit breaker housing, and the middle part connected with the end of the contact supporting rod 31 provided with the movable contact 61 by the main tension spring 33. The lock catch 36 has the middle part rotatably arranged, one end connected with the lock catch-resetting spring 37, and the other end is locked and matched with the other end of the jump buckle 32 and drivingly cooperated with the protecting mechanism 4. Further, one end of the lock catch 36 is connected with the circuit breaker housing by the lock catch-resetting spring 37.

Figure 8:
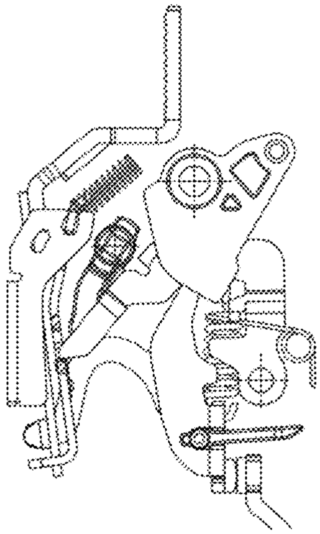
FIG. 8 is a structure view of the operating mechanism in the second embodiment of the present invention during the make-contact state of the plug-in circuit breaker.
Figure 9:
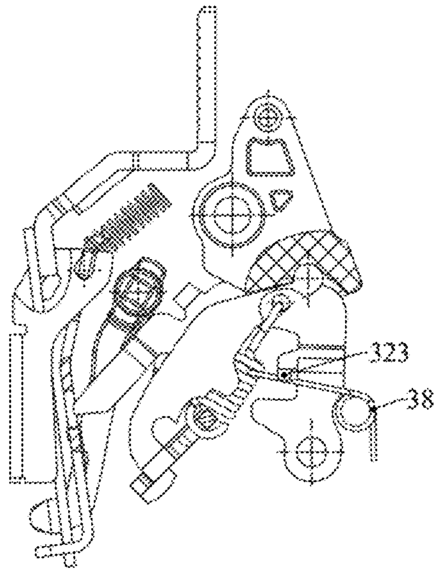
FIG. 9 is a structure view of the operating mechanism in the second embodiment of the present invention during the break-contact state of the plug-in circuit breaker.

Preferably, as shown in FIG. 8, when the plug-in circuit breaker is in the make-contact state, thus a short-circuit fault or an overload fault occurs, at this time the protecting mechanism 4 actuates the operating mechanism 3 to act, so that the plug-in circuit breaker enters the break-contact state (as shown in FIG. 9), after clearing the fault, pressing the operating button 1*d* to move it toward the make-contact position actuates the operating mechanism 3 to act, then the plug-in circuit breaker enters the make-contact state. Further, as shown in FIGS. 3 and 8-9, the operating mechanism 3 includes the U-shaped connecting rod 35, the operating handle 30, the contact supporting rod 31, the jump buckle 32, the lock catch 36, the lock catch-resetting spring 37, the main tension spring 33 and the jump buckle-resetting spring 38. The operating handle 30 is pivotally arranged on the circuit breaker housing. One end of the operating handle 30 is drivingly connected with the operating button 1*d* by the U-shaped connecting rod 35, and the other end of the operating handle 30 is rotatably connected with one end of the contact supporting rod 31, the other end of which is provided with the movable contact 61. The jump buckle 32 has one end pivotally arranged on the circuit breaker housing, and the middle part connected with the end of the contact supporting rod 31 provided with the movable contact 61 by the main tension spring 33. The lock catch 36 has the middle part rotatably arranged, one end connected with the circuit breaker housing by the lock catch-resetting spring 37, and the other end is locked and matched with the other end of the jump buckle 32 and drivingly cooperated with the protecting mechanism 4. The jump buckle-resetting spring 38 has one end connected with the circuit breaker housing, and other end connected with the jump buckle 32. When the plug-in circuit breaker is in the make-contact state, thus a short-circuit fault or an overload fault occurs, at this time the protecting mechanism 4 actuates the lock catch 36 to release the interlock with the jump buckle 32, then the plug-in circuit breaker trips, and the jump buckle-resetting spring 38 actuates the jump buckle 32 to be relocked with the lock catch 36, meanwhile the plug-in circuit breaker enters the break-contact state.

Preferably, as shown in FIGS. 3-9, the protecting mechanism 4 includes the magnetic yoke 40 and the dual metal piece 42. The magnetic yoke 40 is arranged on one side of the lock catch 36, and the dual metal piece 42 is arranged at the middle of the magnetic yoke 40 and positioned between the magnetic yoke 40 and the lock catch 3, having one end fixedly arranged and electrically connected with the first wire-outlet terminal 11, and the other end drivingly cooperated with the lock catch 36 and electrically connected with the movable contact 61. When the plug-in circuit breaker is in the make-contact state, thus a short-circuit fault occurs, at this time the lock catch 36 is attracted to swing toward the magnetic yoke 40, releasing the interlock with the jump buckle 32. When the plug-in circuit breaker is in the make-contact state, thus an overload fault occurs, at this time the dual metal piece 42 bends and actuates the lock catch 36 to swing toward the magnetic yoke 40, releasing the interlock with the jump buckle 32. The protecting mechanism 4 of the present invention has both functions of short-circuit protection and overload protection, and a simple and compact structure, and can effectively reduce the required assembly space during reliably performing protection function, facilitating the development trend of miniaturizing the plug-in circuit breaker.

Preferably, as shown in FIGS. 1-4, the plug-in circuit breaker of the present invention further includes at least two auxiliary signal terminals that are connected to external circuits in a plug-in and plug-out mode. While the movable contact 61 is electrically connected to the first wire-outlet terminal 11, the stationary contact 62 is electrically connected to the first wire-inlet terminal 110. Each auxiliary signal terminal is electrically connected to the first wire-outlet terminal 11, and a signal processing element is connected in series between at least one auxiliary signal terminal and the first wire-outlet terminal 11. Further, the signal processing element includes at least one diode. Further, the plug-in circuit breaker of the present invention further includes the second wire-inlet terminal 100 arranged side by side with the first wire-inlet terminal 110 at one end of the circuit breaker housing, and the second wire-outlet terminal 10 arranged side by side with the first wire-outlet terminal 11 at the other end of the plug-in circuit breaker, and the two auxiliary signal terminals are arranged side by side between the first wire-inlet terminal 110 and the second wire-inlet terminal 100. In the plug-in circuit breaker of the present invention, the auxiliary signal terminals make use of the movable/stationary contact to generate auxiliary signals, saving the space and costs on the installation of auxiliary contacts or similar accessories, facilitating simplifying the structure of the circuit breaker in keeping with the trend of miniaturizing plug-in circuit breakers, and output signals form the auxiliary signal terminals can be employed to judge the make-contact/break-contact state of the plug-in circuit breaker, such as realizing remote monitoring.

Preferably, as shown in FIGS. 10-18, in the plug-in circuit breaker of the present invention, one end of the operating button 1*d* inserted inside the circuit breaker housing is a button inner end, and the other end of the operating button 1*d* protruding outside the circuit breaker housing is a button outer end. An indicator slot is arranged inside the operating button 1*d*, the indicating hole 12*d* is arranged on the button outer end, and the indicating hole 12*d* communicates with one end of the indicator slot. The plug-in circuit breaker further includes the indicating member 7, one end of which is provided with the make-contact indicating surface 70 and the break-contact indicating surface 71 both respectively fitting with the indicating hole 12*d*. When the plug-in circuit breaker is in the break-contact state, the break-contact indicating surface 71 is arranged opposite to the indicating hole 12*d*, thus during pressing the operating button 1*d* to move it toward the make-contact position, the indicating member 7 moves in its entirety inside the indicator slot. After the plug-in circuit breaker enters the make-contact state, the make-contact indicating surface 70 is arranged opposite to the indicating hole 12*d*, thus during pulling the operating button 1*d* to move it toward the break-contact position, the indicating member 7 moves in its entirety inside the indicator slot. After the plug-in circuit breaker enters the break-contact state, the break-contact indicating surface 71 is arranged opposite to the indicating hole 12*d.*

Further, the movement direction of the operating button 1*d* is perpendicular to the movement direction of the indicating member 7 within the indicator slot.

Figure 10:
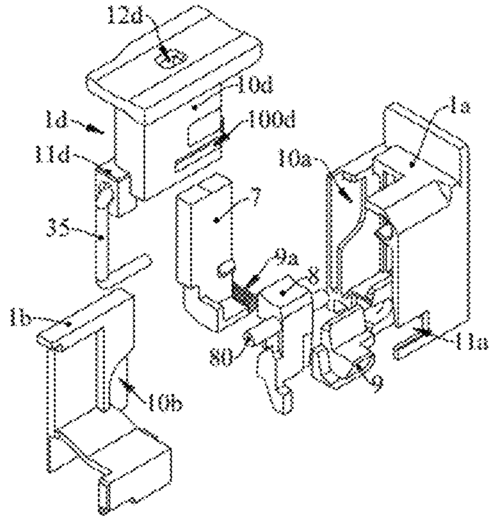
FIG. 10 is an exploded view of the locking mechanism of the present invention.
Figure 12:
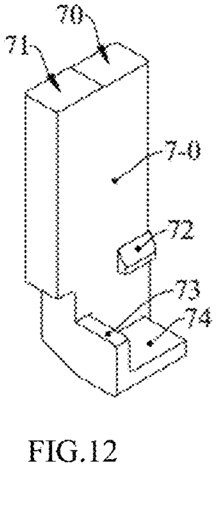
FIG. 12 is a structure view of the indicating member of the present invention, showing at least the indicator horizontal arm and the indicator vertical arm.

Further, as shown in FIGS. 10 and 12, the operating button 1*d* further includes the indicator sliding groove 100*d* respectively arranged on a pair of side walls of the indicator slot, and the extension direction of the indicator sliding groove 100*d* is perpendicular to the movement direction of the operating button 1*d.* The indicating member 7 further includes two indicator sliding stands 72 respectively arranged on a pair of side surfaces thereof, and the indicator sliding stand 72 is slidably arranged in the indicator sliding groove 100*d.*

Figure 11:
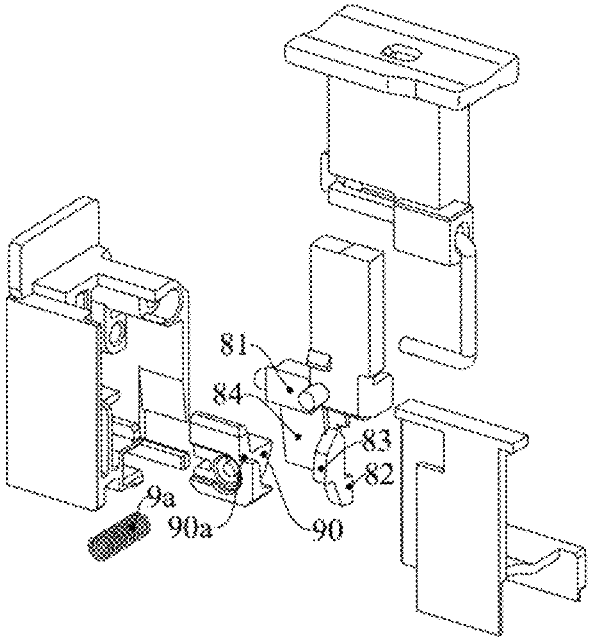
FIG. 11 is another exploded view of the locking mechanism of the present invention.
Figure 13:
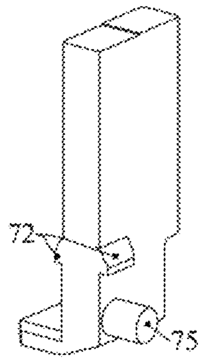
FIG. 13 is a structure view of the indicating member of the present invention, showing at least the indicator tracking shaft.

Further, as shown in FIGS. 10, 11 and 13, the indicating member 7 further includes the indicator tracking shaft 75 arranged at the other end of the indicating member 7. An indicator tracking groove is arranged on the circuit breaker housing, and the indicator tracking shaft 75 is slidably arranged in the indicator tracking groove. When pressing/pulling the operating button 1*d*, the indicator tracking groove drives the indicating member 7 to move in its entirety in the indicator slot by the indicator tracking shaft 75, so that the make-contact indicating surface 70/break-contact indicating surface 71 is arranged opposite to the indicating hole 12*d.*

In the plug-in circuit breaker of the present invention, the indicating member 7 is inserted into the indicator slot arranged inside the operating button 1*d* with less occupied space, facilitating the design of miniaturizing the circuit breaker. The make-contact indicating surface 70 and the break-contact indicating surface 71 of the indicating member 7 are arranged opposite to the indicating hole 12*d*, respectively, so that users can intuitively observe through the indicating hole 12*d* to quickly judge the make-contact/break-contact state of the circuit breaker. Moreover, the indicating member moves in its entirety in the indicator slot, so as to switch between the make-contact indicating surface and the break-contact indicating surface both displayed in the indicating hole, so the indicating member acts more accurately with minor error, thus the make-contact indicating surface or the break-contact indicating surface completely covers the indicating hole, avoiding both the make-contact indicating surface and the break-contact indicating surface from being displayed inside the indicating hole at the same time and resulting in occurrence of misjudgment by users, and facilitating improving the user's electrical safety. The indicator sliding groove 100*d* fits with the indicator sliding stand 72 to limit the movement path of the indicating member 7 and ensure the reliability of indication results.

As shown in FIGS. 1-4, there is an embodiment of the plug-in circuit breaker of the present invention.

The plug-in circuit breaker of the present invention includes a circuit breaker housing and at least one protective pole, wherein the circuit breaker housing includes at least one protective pole-mounting cavity fitting with the protective pole by one-to-one, each protective pole includes the operating button 1*d*, the operating mechanism 3 arranged inside the protective pole-mounting cavity and drivingly connected with the operating button 1*d*, the protecting mechanism 4 drivingly cooperated with the operating mechanism 3, the arc extinguishing system 5, the first wire-inlet terminal 110, the first wire-outlet terminal 11, the movable contact 61 connected with the operating mechanism 3, and the stationary contact 62 fitting with the movable contact 61. One end of the operating button 1*d* is inserted into the circuit breaker housing, at one end of which the operating button 1*d* and the first wire-outlet terminal 11 are both arranged, and at the other end of which the first wire-inlet terminal 110 is arranged. The arc extinguishing system 5 is arranged in the middle of the protective pole-mounting cavity and positioned on one side of the first wire-inlet terminal 110, the operating mechanism 3 is arranged between the operating button 1*d* and the arc extinguishing system 5, and the protecting mechanism 4 is arranged between the first wire-outlet terminal 11 and the arc extinguishing system 5 and positioned on one side of the operating mechanism 3.

Specifically, as shown in FIGS. 1-2, the plug-in circuit breaker of the present invention is a two-pole circuit breaker, including a protective pole and a neutral pole, wherein the protective pole is a L pole, and the neutral pole is a N pole. The plug-in circuit breaker also includes a circuit breaker housing composed of the front cover 1*c*, the base 1*b* and the rear cover 1*a*, wherein the front cover 1*c* and the base 1*b* define the protective pole mounting cavity fitting with the protective pole by one-to-one, and the base 1*b* and the rear cover 1*a* define the neutral pole mounting cavity fitting with the neutral pole. The circuit breaker housing includes the upper side 101, the lower side 102, the front side 105, the rear side 106, the left side 103 and the right side 104. As shown in FIGS. 3-4, the lower end of the operating button 1*d* is inserted in the circuit breaker housing, the operating button 1*d* and the first wire-outlet terminal 11 are arranged on the upper end of the circuit breaker housing, the first wire-inlet terminal 110 is arranged on the lower end of the circuit breaker housing, the arc extinguishing system 5 is arranged in the middle of the protective pole mounting cavity and positioned on the upper side of the first wire-inlet terminal 110, the operating mechanism 3 is arranged between the operating button 1*d* and the arc extinguishing system 5, the protecting mechanism 4 is arranged between the first wire-outlet terminal 11 and the arc extinguishing system 5 and positioned on the left side of the operating mechanism 3.

Preferably, as shown in FIGS. 1-2, the neutral pole further includes the second wire-inlet terminal 100 arranged with the first wire-inlet terminal 110 side by side on lower end of the circuit breaker housing, and the second wire-outlet terminal 10 arranged with the first wire-outlet terminal 11 side by side on the upper end of the circuit breaker housing, and the second wire-inlet terminal 100 is electrically connected with the second wire-outlet terminal 10 through the second electroconductive plate 2*a*. Specifically, as shown in FIG. 1, the first wire-inlet terminal 110 and the second wire-inlet terminal 100 are arranged on the right and left parts of the lower end of the circuit breaker housing, respectively; the first wire-outlet terminal 11 and the second wire-outlet terminal 10 are both arranged on the left side of the operating button 1*d*.

Preferably, as shown in FIG. 2, the first wire-inlet terminal 110 and the second wire-inlet terminal 100 both include the first elastic elements 2*c*, each of which includes a first reed connecting plate and two first reed clamping plates arranged opposite to each other, which are crookedly connected with the two ends of the first reed connecting plate respectively, and each first reed clamping plate has a "<" structure, thus the two first reed clamping plates are integrally formed into an X-shaped structure.

As shown in FIGS. 3-7, there is the first embodiment of the operating mechanism 3 in the plug-in circuit breaker of the present invention.

The operating mechanism 3 of the first embodiment includes the U-shaped connecting rod 35, the operating handle 30, the contact supporting rod 31, the jump buckle 32, the lock catch 36, the lock catch-resetting spring 37 and the main tension spring 33. The operating handle 30 is pivotally arranged on the circuit breaker housing. One end of the operating handle 30 is drivingly connected with the operating button 1*d* by the U-shaped connecting rod 35, and the other end of the operating handle 30 is rotatably connected with one end of the contact supporting rod 31, the other end of which is provided with the movable contact 61. The jump buckle 32 has one end pivotally arranged on the circuit breaker housing, and the middle part connected with the end of the contact supporting rod 31 provided with the movable contact 61 by the main tension spring 33. The lock catch 36 has the middle part rotatably arranged, one end connected with the lock catch-resetting spring 37, and the other end interlocked with the other end of the jump buckle 32 and drivingly cooperated with the protecting mechanism 4. Further, the lock catch-resetting spring 37 has one end connected to one end of the lock catch 36 and the other end connected to the circuit breaker housing. Specifically, the lock catch-resetting spring 37 may be a torsion spring or a straight spring.

Further, as shown in FIGS. 3-7, the jump buckle 32 has an U-shaped structure (see FIG. 6), including the first jump buckle arm 32*a* and the second jump buckle arm 32*b* arranged opposite to each other, and the bottom of the U-shaped structure of the jump buckle 32 is configured to adjoin the end of the operating handle 30 connected with the contact supporting rod 31. The first jump buckle arm 32*a* has one end pivotally arranged, and the other end connected with one end of the second jump buckle arm 32*b*, and the other end of the second jump buckle arm 32*b* is locked with the lock catch 36.

Further, as shown in FIGS. 3-7, the contact supporting rod 31 has an arch structure in its entirety, one end provided with the supporting rod rotation shaft 311 rotatably connected with the operating handle 30, and the other end provided with the movable contact 61 (see FIG. 5). The movable contact 61 includes the movable contact plate 610 connected with the contact supporting rod 31 and the movable contact point 611 arranged at one end of the movable contact plate 610, and the other end of the movable contact plate 610 is connected with the main tension spring 33. Further, the middle of the contact supporting rod 31 is also provided with the arc isolating plate 34 (see FIG. 3). When the plug-in circuit breaker is in the break-contact state, the arc isolating plate 34 enters between the movable contact 61 and the stationary contact 62, in the make-contact state, the arc isolating plate 34 moves out between the movable contact 61 and the stationary contact 62.

Further, as shown in FIGS. 5-7, the contact supporting rod 31 further includes the linkage member 44 having the linkage rod 440 and the linkage shaft 441 arranged at one end of the linkage rod 440. The linkage shaft 440 has two ends respectively pivoted on the circuit breaker housing and the middle provided with the polygonal hole 4410 in its axial direction, and the side of the linkage rod 440 opposite to the jump buckle 32 is provided with the linkage member activated stand 442. The second jump buckle arm 32*b* is provided with the linkage member activating stand 322 that is drivingly cooperated with the linkage member activated stand 442. The plug-in circuit breaker includes a plurality of protective poles, the linkage shafts 441 of which are connected with each other by linkage member connecting shafts, and the linkage member connecting shafts fit with the polygonal hole 4410 of each linkage member 44, respectively. When a certain protective pole trips, the linkage member activating stand 322 of the jump buckle 32 of the protective pole drives the linkage rod 440 to swing by the linkage member activated stand 442, thus the linkage rod 440 drives the linkage shaft 441 to rotate, and the linkage shaft 441 drives the linkage rods 440 of other protective poles to swing by the linkage member connecting shaft, knocking the lock catch 36 of each protective pole, respectively, so as to make each protective pole trip synchronously. Further, the linkage members 44 of each protective pole can be connected with each other by one linkage member connecting shaft, or two adjacent protective poles are connected with each other by one linkage member connecting shaft.

Specifically, as shown in FIGS. 4-7, the jump buckle 32 and the contact supporting rod 31 are both arranged below the operating handle 30, and the operating handle 30 has the upper end connected to the operating button 1*d* by the U-shaped connecting rod 35, the middle pivotally arranged on the circuit breaker housing, and the lower end rotatably connected with the supporting rod rotation shaft 311 on the upper end of the contact supporting rod 31. The jump buckle 32 has an U-shaped structure with its opening facing downward, and includes the second jump buckle arm 32*b* and the first jump buckle arm 32*a* respectively arranged on the left and right sides of the jump buckle 32. The first jump buckle arm 32*a* has the upper end pivotally arranged on the circuit breaker housing, and the upper end connected to the upper end of the second jump buckle arm 32*b*, and the lower end of the second jump buckle arm 32*b* is locked with with the lock catch 36. The middle of the jump buckle 32 is connected with the upper end of the movable contact plate 610 of the contact supporting rod 31 by the main tension spring 33. The contact supporting rod 31 has the upper end stacked on the front side of the middle of the jump buckle 32, and the lower end provided with the movable contact 61 including the movable contact plate 610, and the movable contact plate 610 has the right side of the lower end provided with the movable contact point 611, and the upper end connected to the lower end of the main tension spring 33. The arc isolating plate 34 has the left end rotatably connected with the lower end of the contact supporting rod 3, and the right end fitting with the movable contact 61 and the stationary contact 62, extends between the movable contact 61 and the stationary contact 62 in the break-contact state, and moves out between the movable contact 61 and the stationary contact 62 in the make-contact state. Preferably, the contact supporting rod 31 is provided with the rod-barrier limit groove, when the contact supporting rod 31 drives the movable contact 61 and the stationary contact 62 to be in the break/make-contact state, the rod-barrier limit groove drives the arc isolating plate 34 to extend into and out of the space between the movable contact and the stationary contact and limits the swing scope of the right end of the arc isolating plate 34. The lock catch 36 is arranged on the left side of the jump buckle 32, and has the middle part pivotally arranged, the upper end connected to the circuit breaker housing by the lock catch-resetting spring 37, and the lower end interlocked with the lower end of the second jump buckle arm 32*b* of the jump buckle 32. The linkage member 44 is arranged between the lock catch 36 and the jump buckle 32, and the linkage rod 440 has the upper end pivoted by the linkage shaft 441, and the middle part positioned on the right side below the linkage shaft 441 and provided with the linkage member activated stand 442. The left side of the upper end of the second jump buckle arm 32*b* is provided with the linkage member activating stand 322 drivingly cooperated with the linkage member activated stand 442. Preferably, as shown in FIG. 4, the operating handle 30 is pivotally arranged on the circuit breaker housing by the operating handle mounting shaft 14. Further, both ends of the operating handle mounting shaft 14 are pivotally connected to the front cover 1*c* and the base 1*b*, respectively. Further, as shown in FIGS. 5-7, the operating handle 30 further includes a handle-connection hole fitting with the U-shaped connecting rod 35, a handle-support hole fitting with the supporting rod rotation shaft 311 of the contact supporting rod 31, and a handle shaft hole fitting with the operating handle mounting shaft 14. The shape of the operating handle 30 is approximately a triangle, at three vertices of which there are the handle-connection hole, the handle shaft hole and the handle-support hole respectively arranged.

Preferably, as shown in FIG. 4, the lower end of the first jump buckle arm 32*a* of the jump buckle 32 is pivotally arranged on the circuit breaker housing by the jump buckle mounting shaft 15. Further, the two ends of the jump buckle mounting shaft 15 are pivotally connected to the front cover 1*c* and the base 1*b*, respectively. Preferably, as shown in FIG. 5, the middle of the jump buckle 32 is provided with the jump buckle-spring connection hole 320 connected with one end of the main tension spring 33, and the upper end of the movable contact plate 610 is provided with the movable contact plate-spring connection hole 310. Preferably, as shown in FIG. 5, the lower end of the second jump buckle arm 32*b* has a wedge-shaped structure, and the lower end of the jump buckle 36 is provided with the lock catch hole 363 interlocked with the lower end of the second jump buckle arm 32*b*.

As shown in FIGS. 8-9, there is the second embodiment of the operating mechanism 3 in the plug-in circuit breaker of the present invention.

The operating mechanism 3 of the second embodiment is different from that of the first embodiment in that it further includes the jump buckle-resetting spring 38, one end of which is connected with the circuit breaker housing, and the other end of which is connected with the jump buckle 32. When the plug-in circuit breaker is in the make-contact state, thus a short-circuit fault or an overload fault occurs, at this time the protecting mechanism 4 actuates the lock catch 36 to release the coupling with the jump buckle 32, then the plug-in circuit breaker trips, and the jump buckle-resetting spring 38 actuates the jump buckle 32 to rotate, so that the jump buckle 32 is recoupled with the lock catch 36, meanwhile the plug-in circuit breaker enters the break-contact state. Further, the jump buckle-resetting spring 38 is a torsion spring encircling the jump buckle-resetting spring shaft 380 positioned on one side of the first jump buckle arm 32*a*, and the two ends of the jump buckle-resetting spring shaft 380 are fixed on the circuit breaker housing, respectively. The middle of the first jump buckle arm 32*a* is provided with the jump buckle-resetting protrusion 323, and the jump buckle-resetting spring 38 has one end connected with the circuit breaker housing, and the other end connected with the jump buckle 32.

Specifically, as shown in FIGS. 8-9, after the lock catch 36 is released from the coupling with the jump buckle 32, while the jump buckle 32 rotates counterclockwise, the contact supporting rod 31 rotates clockwise, after the contact supporting rod 31 drives the movable contact 61 to enter the tripping position, the jump buckle-resetting spring 38 enables the jump buckle 32 to rotate clockwise by the jump buckle-resetting protrusion 323 until the lower end of the second jump buckle arm **32*b* is relocked with the lock catch 36** again.

As shown in FIGS. 3-9, there is an embodiment of the protecting mechanism 4 in the plug-in circuit breaker of the present invention.

The protecting mechanism 4 includes the magnetic yoke 40 and the dual metal piece 42. The magnetic yoke 40 is arranged on one side of the lock catch 36, and the dual metal piece 42 is arranged at the middle of the magnetic yoke 40 and positioned between the magnetic yoke 40 and the lock catch 3, having one end fixedly arranged and electrically connected with the first wire-outlet terminal 11, and the other end drivingly cooperated with the lock catch 36 and electrically connected with the movable contact 61. When the plug-in circuit breaker is in the make-contact state, thus a short-circuit fault occurs, at this time the lock catch 36 is attracted to swing toward the magnetic yoke 40, releasing the interlock with the jump buckle 32. When the plug-in circuit breaker is in the make-contact state, thus an overload fault occurs, at this time the dual metal piece 42 actuates the lock catch 36 to swing toward the magnetic yoke 40, releasing the interlock with the jump buckle 32.

Specifically, as shown in FIGS. 5-9, while the magnetic yoke 40 is arranged on the left side of the lock catch 36, the dual metal piece 42 is arranged at the middle of the magnetic yoke 40 and positioned between the magnetic yoke 40 and the lock catch 36, and the lock catch 36 has the upper end fixedly arranged, the middle part rotatably arranged, and the lower end arranged opposite to the magnetic yoke 40, drivingly cooperated with the dual metal piece 42 and interlocked with the jump buckle 32. When the plug-in circuit breaker is in the make-contact state, thus a short-circuit fault occurs, at this time the short-circuit current flows through the dual metal piece 42, and the generated magnetic field is strengthened by the magnetic yoke 40, so that the lower end of lock catch 36 is attracted to swing toward the magnetic yoke 40, so as to release the interlock with the jump buckle 32. When the plug-in circuit breaker is in the make-contact state, thus an overload fault occurs, at this time the dual metal piece 42 generates heat and bends to the left, actuating the lower end of the lock catch 36 to swing toward the magnetic yoke 40, so as to release the interlock with the jump buckle 32.

Preferably, as shown in FIGS. 5-9, the lock catch 36 has the middle rotatably arranged on one end of the magnetic yoke 40, one end connected with the circuit breaker housing by the lock catch-resetting spring 37, and the other end arranged opposite to the magnetic yoke 40. The dual metal piece 42 has the fixed end electrically connected with the first wire-outlet terminal 11 by the first electroconductive plate **2*b* (see FIG. 3), the other end electrically connected with the contact supporting rod 31 through the soft connection 63, and the stationary contact 62 is electrically connected with the first wire-inlet terminal 110. Further, the protection mechanism 4 also includes an adjustment screw which is in limit fit with the circuit breaker housing, and which has one end threadedly engaged with the end of the first electroconductive plate 2*b* connected with the dual metal piece 42, so as to adjust the position of the dual metal piece 42, and furthermore the tripping threshold or parameter of the dual metal piece 42**.

Specifically, as shown in FIGS. 2-9, the lock catch 36 has the middle rotatably arranged on the upper end of the magnetic yoke 40, the upper end connected with the circuit breaker housing by the lock catch-resetting spring 37, and the lower end arranged opposite to the magnetic yoke 40. The dual metal piece 42 has the upper end electrically connected with the first wire-outlet terminal 11 by the first electroconductive plate **2*b*, and the lower end electrically connected with the contact supporting rod 31 through the soft connection 63, and the stationary contact 62 is electrically connected with the first wire-inlet terminal 110**.

Preferably, the first electroconductive plate **2*b* is electrically connected with the contact supporting rod 31 through a second soft connection, adding a circuit extending from the second electroconductive plate 2*b*** to the contact supporting rod. Therefore, when a short-circuit fault occurs in a plug-in circuit breaker specified with a large ampere rated current, the current flowing in the dual metal piece is reduced, avoiding the occurrence of the failure of the dual metal piece from being overheated due to an excessive current.

Preferably, as shown in FIGS. 3-9, the cross section of the magnetic yoke 40 has a ⊔ shaped structure, and one end of the magnetic yoke 40 is provided with two yoke supporting arms 400 arranged opposite to each other (see FIG. 6), on which there is the yoke limiting groove 401 arranged. The lock catch 36 includes the lock catch-resetting end 360, the lock catch supporting arm 361, the lock catch body 362, the lock catch hole 363 and the lock catch activated end 364 (see FIG. 5), and the lock catch-resetting end 360, the lock catch body 362 and the lock catch activated end 364 are connected with each other in sequence. The lock catch-supporting arm 361 is arranged on both sides of the connection between the lock catch-resetting end 360 and the lock catch body 362, and the lock catch activated end 364 has a L-shaped structure, one end crookedly connected with the lock catch body 362, and the other end drivingly cooperated with the dual metal piece 42. The two lock catch-supporting arms 361 are respectively arranged inside two yoke limiting grooves 401, the lock catch body 362 is arranged opposite to the magnetic yoke 400, and the lock catch hole 363 is arranged on the lock catch body 362 and interlocked with the jump buckle 32.

Specifically, as shown in FIGS. 3-9, and upper end of the magnetic yoke 40 is provided with two yoke supporting arms 400 arranged opposite to each other (see FIG. 6), on which there is the yoke limiting groove 401 arranged. The lock catch body 362 has the upper end crookedly connected with the lock catch-resetting end 360, and the lower end crookedly connected with the lock catch activated end 364. While the lock catch-resetting end 360 bends to the right, the lock catch activated end 364 bends to the left, and the lock catch hole 363 is arranged in the middle of the lock catch body 362 to fit with the magnetic yoke 40.

As shown in FIGS. 3-4, there is an embodiment of the arc extinguishing system 5 in the plug-in circuit breaker of the present invention.

The arc extinguishing system 5 includes the arc extinguishing chamber 50, and the movable contact arcing plate 51 and the stationary contact arcing plate 52 respectively arranged on both sides of the arc extinguishing chamber 50. The movable contact arcing plate 51 fits with the movable contact 61 and is electrically connected with the first wire-outlet terminal 11, and the stationary contact arcing plate 52 has one end provided with the stationary contact 62, and the other end electrically connected with the first wire-inlet terminal 110.

Specifically, as shown in FIGS. 3-4, the movable contact arcing plate 51 and the stationary contact arcing plate 52 are respectively arranged on the left and right sides of the arc extinguishing chamber 50, and the movable contact arcing plate 51 is electrically connected with the first wire-outlet terminal 11 and has the upper end fitting with the movable contact 61. The stationary contact arcing plate 52 has the upper end provided with the stationary contact 62, and the lower end electrically connected with the first wire-inlet terminal 110, and the upper end of the movable contact arcing plate 51 and the upper end of the stationary contact arcing plate 52 bend to each other.

Preferably, as shown in FIGS. 1-4, the plug-in circuit breaker of the present invention further includes at least two auxiliary signal terminals that are connected to external circuits in a plug-in and plug-out mode. Each auxiliary signal terminal is electrically connected to the first wire-outlet terminal 11, and a signal processing element is connected in series between at least one auxiliary signal terminal and the first wire-outlet terminal 11. Further, the signal processing element includes at least one diode. Further, a signal processing element is connected in series between each auxiliary signal terminal and the first wire-outlet terminal 11, or a signal processing element is connected in series between one auxiliary signal terminal and the first wire-outlet terminal 11, and a signal processing element is not connected in series between another auxiliary signal terminal and the first wire-outlet terminal 11. The plug-in circuit breaker of the present invention preferably adopts the latter method, so that the plug-in circuit breaker can output a DC signal through one auxiliary signal terminal and output an AC signal through another auxiliary signal terminal, so as to strengthen the adaptability of the plug-in circuit breaker and ensure to meet the requirements of different application environments.

It should be pointed out that the signal processing element is not limited to diodes, may be other elements capable of converting an AC signal into a DC signal. Of course, the signal processing element can also be simply added with functions according to user needs.

Specifically, as shown in FIGS. 1-4, the plug-in circuit breaker of the present invention includes two auxiliary signal terminals that are connected to the external circuit in a plug-in and plug-out mode, which are the first auxiliary signal terminal 12 and the second auxiliary signal terminal 13 respectively, and each auxiliary signal terminal is electrically connected with the first wire-outlet terminal 11 by the movable contact arcing plate 51, and one diode is connected in series between the second auxiliary signal terminal 13 and the movable contact arcing plate 51. Further, as shown in FIGS. 1-4, the first wire-inlet terminal 110, the second wire-inlet terminal 100, the first auxiliary signal terminal 12 and the second auxiliary signal terminal 13 are all arranged on the lower end of the plug-in circuit breaker, the first auxiliary signal terminal 12 and the second auxiliary signal terminal 13 are arranged side by side between the first wire-inlet terminal 110 and the second wire-inlet terminal 100. Further, the auxiliary signal terminal can be connected to a circuit structure such as an external control circuit board, so as to realize for example remote monitoring.

Preferably, as shown in FIGS. 3 and 4, each auxiliary signal terminal includes the second elastic elements 2d, each of which includes a second reed connecting plate and two second reed clamping plates arranged opposite to each other, which are crookedly connected with the two ends of the second reed connecting plate respectively, and each second reed clamping plate has a "<" structure, thus the two second reed clamping plates are integrally formed into an X-shaped structure.

Preferably, as shown in FIG. 3, the plug-in circuit breaker of the present invention further includes the air exhaust opening 16, and a first exhaust passage is also provided in the protective pole mounting cavity. The first exhaust passage has one end communicating with the air vent of the arc extinguishing chamber 50 of the arc extinguishing system 5, and the other end communicating with the external environment through the air exhaust opening 16. Specifically, as shown in FIG. 3, the air exhaust opening 16 is arranged on the lower end surface of the circuit breaker housing and positioned between the second auxiliary signal terminal 13 and the first wire-inlet terminal 110.

Preferably, as shown in FIGS. 10-13, in the plug-in circuit breaker of the present invention, one end of the operating button 1d inserted inside the circuit breaker housing is a button inner end, and the other end of the operating button 1d protruding outside the circuit breaker housing is a button outer end. An indicator slot is arranged inside the operating button 1d, the indicating hole 12d is arranged on the button outer end, and the indicating hole 12d communicates with one end of the indicator slot. The plug-in circuit breaker further includes the indicating member 7 slidably inserted into the indicator slot, one end of the indicating member 7 is provided with the make-contact indicating surface 70 and the break-contact indicating surface 71 both respectively fitting with the indicating hole 12d. When the plug-in circuit breaker is in the break-contact state, the break-contact indicating surface 71 is arranged opposite to the indicating hole 12d, thus during pressing the operating button 1d to move it toward the make-contact position, the indicating member 7 moves in its entirety inside the indicator slot. After the plug-in circuit breaker enters the make-contact state, the make-contact indicating surface 70 is arranged opposite to the indicating hole 12d, thus during pulling the operating button 1d to move it toward the break-contact position, the indicating member 7 moves in its entirety inside the indicator slot. After the plug-in circuit breaker enters the break-contact state, the break-contact indicating surface 71 is arranged opposite to the indicating hole 12d.

Preferably, the movement direction of the operating button 1d is perpendicular to the movement direction of the indicating member 7 within the indicator slot.

Preferably, as shown in FIGS. 10-11, the operating button 1d further includes the indicator sliding groove 100d respectively arranged on a pair of side walls of the indicator slot, and the extension direction of the indicator sliding groove 100d is perpendicular to the movement direction of the operating button 1d. as shown in FIGS. 12, the indicating member 7 further includes two indicator sliding stands 72 respectively arranged on a pair of side surfaces thereof, and the indicator sliding stand 72 is slidably arranged in the indicator sliding groove 100d to restrict the movement path of the indicating member 7 inside the indicator sliding groove 100d.

Preferably, as shown in FIGS. 11 and 13, the indicating member 7 further includes the indicator tracking shaft 75 arranged at the other end of the indicating member 7. as shown in FIGS. 10, an indicator tracking groove is arranged on the circuit breaker housing, and the indicator tracking shaft 75 is slidably arranged in the indicator tracking groove. When pressing/pulling the operating button 1d, the indicator tracking groove drives the indicating member 7 to move in its entirety in the indicator slot by the indicator tracking shaft 75, so that the make-contact indicating surface 70/break-contact indicating surface 71 is arranged opposite to the indicating hole 12d. The indicator tracking groove is an inclined tracking groove, which may be slantingly arranged in a straight line or in an arc. As another embodiment of moving the indicating member 7, while an inclined actuating surface can also be provided on the indicating member 7, a actuating protrusion can be provided on the circuit breaker housing, so that the indicating member moves horizontally with respect to the operating button 1*d* by means of the fit between the inclined actuating surface and the actuating protrusion, when the operating button 1*d* is pressed/pulled.

Further, as shown in FIG. 10, the indicator tracking groove is an inclined tracking groove, which is formed by means of the fit between two inclined half-grooves arranged opposite to each other on the circuit breaker housing. When the plug-in circuit breaker is in the break-contact state, the indicator tracking shaft 75 is positioned at one end of the indicator tracking groove, which is the first tracking groove end; when the plug-in circuit breaker is in the make-contact state, the indicator tracking shaft 75 is positioned at the other end of the indicator tracking groove, which is the second tracking groove end. The first tracking groove end is closer to the button outer end of the operating button 1*d* than the second tracking groove end.

It should be pointed out that the make-contact indicating surface 70 and the break-contact indicating surface 71 may be different from each other in color, for example, the make-contact indicating surface is green, but the break-contact indicating surface is red; or the make-contact indicating surface 70 and the break-contact indicating surface 71 may be different from each other in characters or symbol identification, for example, the make-contact indicating surface 70 has the word "make-contact" or the symbol "|", and the break-contact indicating surface 71 has the word "break-contact" or the symbol "o". Of course, the implementation forms for both are not limited to the above two, as long as the make-contact indicating surface 70 and the break-contact indicating surface 71 can be effectively distinguished from each other, so as to correctly indicate the make-contact and break-contact states of the plug-in circuit breaker.

Specifically, as shown in FIGS. 10 and 11, the operating button 1*d* has the upper end as the button outer end, and the lower end as the button inner end, and the end face of the button outer end is provided with the indicating hole 12*d*, which is connected with the upper end of the indicator slot. The make-contact indicating surface 70 and the break-contact indicating surface 71 are arranged side by side at the upper end of the indicating member 7, the two indicator sliding stands 72 are arranged on both sides of the middle of the indicating member 7, and the indicator tracking shaft 75 is arranged at the lower end of the indicating member 7. As shown in FIG. 10, the indicator tracking groove is formed by means of the fit between two inclined half grooves, one inclined half groove is arranged on the rear cover 1*a*, being the first half groove 10*a*, and the other inclined half groove is arranged on the base 1*b*, being the second half groove 10*b*. The upper right end of the indicator tracking groove is the first tracking groove end, and the lower left end is the second tracking groove end. When the plug-in circuit breaker is in the break-contact state, the indicator tracking shaft 75 is positioned at the first tracking groove end; when the plug-in circuit breaker is in the make-contact state, the indicator tracking shaft 75 is positioned at the second tracking groove end. As shown in FIG. 10, when the plug-in circuit breaker is in the break-contact state, thus the operating button 1*d* is pressed down (the operating button 1*d* moves toward the make-contact position), as the operating button 1*d* moves linearly, and the indicator tracking groove is inclined from the upper right to the lower left, therefore the indicator tracking groove actuates the indicating member 7 to move laterally by the indicator tracking shaft 75 (the indicating member 7 moves in its entirety in the indicator slot), so as to switch from the configuration of the break-contact indicating surface 71 opposite to the indicating hole 12*d* to the configuration of the make-contact indicating surface 70 opposite to the indicating hole 12*d*. When the plug-in circuit breaker is in the make-contact state, the operating button 1*d* is pulled upward, thus the indicating member 7 goes through the process opposite to above-mentioned process.

Figure 15:
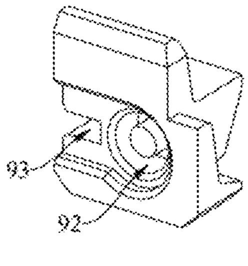
FIG. 15 is a structure view of the first locking member of the present invention, showing at least the spring-limiting groove and the first tracking groove.
Figure 16:
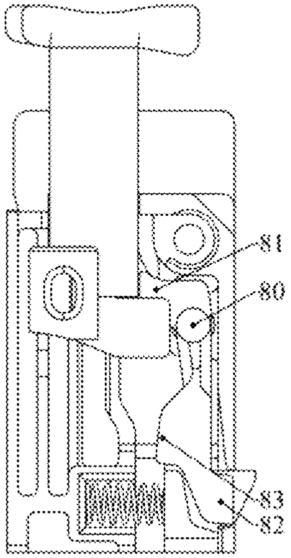
FIG. 16 is a structure view of the locking mechanism of the present invention during the break-contact state of the plug-in circuit breaker.
Figure 17:
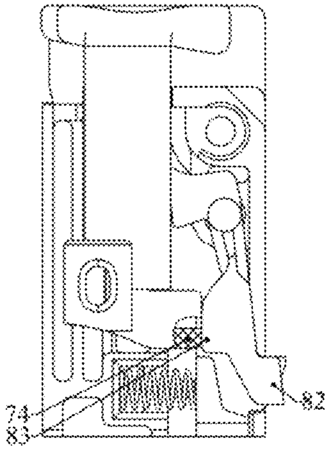
FIG. 17 is a structure view of the locking mechanism of the present invention during the make-contact state of the plug-in circuit breaker.
Figure 18:
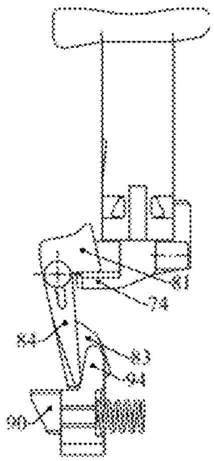
FIG. 18 is a structure view of the locking mechanism of the present invention, showing at least the fit arrangement between the second locking member activating portion and the second activated protrusion of the second locking member.

Preferably, as shown in FIGS. 10-18, the plug-in circuit breaker of the present invention further includes a locking mechanism, wherein the locking mechanism includes the second locking member 8 pivotally arranged in the middle, the second locking member 8 includes the locking member upper end and the locking member lower end respectively arranged at both ends thereof, and the locking member lower end is provided with the second protrusion 82. When the plug-in circuit breaker is in the make-contact state, the operating button 1*d* actuates the second locking member 8 to rotate by the locking member lower end, so that the second protrusion 82 protrudes outside the circuit breaker housing; when the plug-in circuit breaker is in the break-contact state, the operating button 1*d* actuates the second locking member 8 to rotate by the locking member upper end, so that the second protrusion 82 moves into the circuit breaker housing. Further, as shown in FIGS. 11, 12 and 18, the indicating member 7 further includes the indicator horizontal arm 74 arranged at one end thereof. The second locking member 8 further includes the second locking member activated portion 81 arranged at the locking member upper end, and the operating button 1*d* are drivingly cooperated with the second locking member activated portion 81 by the indicator horizontal arm 74 to drive the second locking member 8 to rotate, so that the second protrusion 82 moves into the circuit breaker housing. Further, as shown in FIGS. 11, 12 and 17, the second locking member 8 further includes the second locking member activated protrusion 83 arranged at the locking member lower end, and the second locking member activated protrusion 83 protrudes in the reverse direction of the second protrusion 82. When the plug-in circuit breaker is in the make-contact state, the indicator horizontal arm 74 is positioned on one side of the second locking member activated protrusion 83 and in limit fit with it, so as to keep the second protrusion 82 protruding outside the circuit breaker housing.

Specifically, as shown in FIG. 18, the indicator horizontal arm 74 is arranged on the lower end of the indicating member 7 and connected with the right angle thereof, and protrudes to the left, and the second locking member activated portion 81 is arranged on the upper end of the second locking member 8 and connected with the right angle thereof, and protrudes to the right. The second protrusion 82 (In FIG. 18, the second protrusion 82 is screened by the first locking member 9) and the second locking member activated protrusion 83 are both arranged on the lower end of the second locking member 8 and protrude to the left and right sides of the second locking member 8 respectively, and the indicator horizontal arm 74 is positioned on the lower side of the second locking member activated portion 81 and drivingly cooperated with it. As shown in FIG. 18, when the plug-in circuit breaker is in the break-contact state, the operating button 1*d* actuates the second locking member 8 to rotate counterclockwise by means of the fit between the indicator horizontal arm 74 and the second locking member activated portion 81, so that the second protrusion 82 moves into the circuit breaker housing. As shown in FIG. 17, when the plug-in circuit breaker is in the make-contact state, the operating button 1*d* moves down, and the indicator horizontal arm 74 abuts against the second locking member activated protrusion 83, so that the second locking member 8 rotates counterclockwise, thus the second protrusion 82 protrudes outside the circuit breaker housing. As the indicator horizontal arm 74 is positioned on the left side of the second locking member activated protrusion 83 and in limit fit with it, the second protrusion 82 keeps protruding outside the circuit breaker housing.

For the plug-in circuit breaker of the present invention, in the make-contact state, the indicator horizontal arm 74 of the indicating member 7 keeps the second protrusion 82 of the second locking member 8 protruding outside the circuit breaker housing, preventing the circuit breaker from being installed under the make-contact state and occurrence of electric shock, and facilitating improving the user's electricity safety.

It should be pointed out that the actuation of the second locking member 8 is not only limited to the actuation under the indicator horizontal arm 74, a structure similar to the indicator horizontal arm 74 is but also arranged on the lower end of operating button 1*d* to actuate the second locking member 8.

Preferably, as shown in FIGS. 10-11, 14-15, and 16-18, the locking mechanism further includes the first locking member 9, which has one end slidably arranged inside the circuit breaker housing, and the other end being the first protrusion 90 protruding outside the circuit breaker housing. When the plug-in circuit breaker is assembled to a cavitated circuit breaker assembling position, the housing of the circuit breaker assembling position presses the first protrusion 90, so that the first locking member 9 moves in its entirety to the inside of the circuit breaker housing. After the plug-in circuit breaker has been assembled to reach the designated position, the first protrusion 90 protrudes outside the circuit breaker housing and is in limit fit with the housing of the circuit breaker assembling position.

In the plug-in circuit breaker of the present invention, after the plug-in circuit breaker is assembled to the cavitated circuit breaker assembling position and reaches the designated position, the first locking member 9 is in limit fit with the housing of the circuit breaker assembling position, ensuring the assembly reliability of the plug-in circuit breaker, preventing the plug-in circuit breaker from being pulled out by mistake under the make-contact state, and improving the user's electricity safety.

Preferably, as shown in FIGS. 16-18, the locking member lower end of the second locking member 8 is drivingly cooperated with the first locking member 9. When the plug-in circuit breaker is in a break-contact state, pulling the operating button actuates the first locking member 9 to move in its entirety toward the inside of the circuit breaker housing by the second locking member 8, so as to release the limit fit between the first protrusion 90 and the housing of the circuit breaker assembling position. Further, as shown in FIGS. 14-18, the first sliding end 90*a* further includes the first activated protrusion 91 and the second activated protrusion 94. The second locking member 8 further includes the second locking member body 84 pivotally arranged in the middle, the second locking member activated portion 81 of the second locking member 8 is crookedly connected with one end of the second locking member body 84, and the other end of the second locking member body 84 is provided with the second protrusion 82 and drivingly cooperated with the second activated protrusion 94. The second locking member activated portion 81 and the second protrusion 82 protrude toward the both sides of the second locking member body 84, respectively, and the second protrusion 82 is drivingly cooperated with the first activated protrusion 91.

It should be pointed out that the first locking member 9 can exclude the first activated protrusion 91 or the second activated protrusion 94, thus retain either of the two to fit with the second locking member 8. Of course, such improvement will abate the stability and reliability of the action of the first locking member 9.

Preferably, as shown in FIGS. 11 and 15, the first locking member 9 further includes the first sliding end 90*a* slidably arranged inside the circuit breaker housing, wherein the first sliding end 90*a* has one side connected with the first protrusion 90, and the other side connected with the circuit breaker housing by the first locking member resetting spring 9*a* applying a force to the first locking member 9 to keep the first protrusion 90 protruding outside the circuit breaker housing.

Specifically, as shown in FIGS. 16 and 17, the upper end of the second locking member activating portion 84 is crookedly connected with the second locking member activated portion 81 (connected at a right angle or approximately at a right angle), the second protrusion 82 is arranged on the edge of one side edge of the lower end of the second locking member body 84, and the lower end of the second locking member activating portion 84 and the second protrusion 82 are arranged on the right sides of the second activated protrusion 94 and the first activated protrusion 91, respectively. As shown in FIG. 16, when the plug-in circuit breaker is in a break-contact state, pulling up the operating button 1*d* actuates the second locking member 8 to rotate clockwise through the fit between the indicator horizontal arm 74 of the indicating member 7 and the second locking member activated portion 81, thus the lower end of the second locking member activating portion 84 actuates the first locking member 9 to move to the left (move into the breaker housing) by the second activated protrusion 94, so does the second protrusion 82 by the first activated protrusion 91, so as to release the first protrusion 90 of the first locking member 9 from the limit fit with the housing of the circuit breaker assembling position.

Preferably, as shown in FIG. 10, the circuit breaker housing is provided with the first opening 11*a* fitting with the first protrusion 90 and the second protrusion 82. Specifically, as shown in FIG. 1, the first opening 11*a* is arranged on the right side of the circuit breaker housing, and the first protrusion 90 and the second protrusion 82 protrude outside the circuit breaker housing through the first opening 11*a*, respectively.

As shown in FIGS. 11-18, there is an embodiment of the locking mechanism in the plug-in circuit breaker of the present invention.

As shown in FIGS. 10 and 11, the locking mechanism includes the first locking member 9, the second locking member 8 and the indicating member 7. The indicating member 7 has one end inserted into the operating button 1*d*, and the other end drivingly cooperated with the second locking member 8, and the second locking member 8 has the middle pivotally arranged, and one end drivingly cooperated with the first locking member 9.

Figure 14:
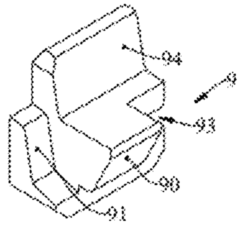
FIG. 14 is a structure view of the first locking member of the present invention, showing at least the first protrusion, the first activated protrusion and the second activated protrusion.

Preferably, as shown in FIGS. 10,11, 14 and 15, the first locking member 9 further includes the first sliding end 90*a* and the first protrusion 90 respectively arranged both end thereof, wherein the first sliding end 90*a* has one side connected with the first protrusion 90, and the other side connected with the circuit breaker housing by the first locking member resetting spring 9*a* Further, as shown in FIG. 15, the first sliding end 90*a* includes the spring-limiting groove 92 arranged on one side thereof, and a spring-limiting protrusion is also arranged in the middle of the spring-limiting groove 92. One end of the first locking member resetting spring 9*a* is inserted into the spring-limiting groove 92, and encircles the spring-limiting protrusion. Further, as shown in FIG. 15, one end of the first sliding end 90*a* is provided with the first tracking groove 93 fitting with the first sliding track on the circuit breaker housing to define a sliding path of the first sliding end 90*a*. Further, as shown in FIG. 14, the first sliding end 90*a* further includes the first activated protrusion 91 and the second activated protrusion 94, wherein the first activated protrusion 91 and the first tracking groove 93 are respectively arranged at both ends of the first sliding end 90*a*, and the second activated protrusion 94 are arranged on the upper side of the first sliding end 90*a* and positioned between the first activated protrusion 91 and the first tracking groove 93.

Preferably, as shown in FIGS. 10, 11 and 16-18, the second locking member 8 includes the second locking member activated portion 81, the second locking member body 84, the second locking member activated protrusion 83, the second locking member activated protrusion 83 and the second protrusions 82. The second locking member body 84 has the middle part pivotally arranged on the circuit breaker housing by the second locking member mounting shaft 80, one end crookedly connected with the second locking member activated portion 81, and the other end provided with the second locking member activated protrusion 83 and the second protrusions 82. The second locking member activated portion 81 and the second protrusion 82 protrude toward both sides of the second locking member body 84, respectively, and the second locking member activated portion 81 and the second locking member activated protrusion 83 both protrude on the identical side of the second locking member body 84.

Specifically, as shown in FIGS. 10 and 11, the second locking member 8 includes a locking member upper end and a locking member lower end respectively arranged on the upper and lower ends thereof, and the second locking member activated portion 81 is crookedly connected with the second locking member body 84 (connected at a right angle or approximately at a right angle) to form the locking member upper end; the second locking member activated protrusion 83 and the second protrusions 82 are both arranged on the lower end of the second locking member body 84, thus the second protrusion 82 and the lower end of the second locking member body 84 form the locking member lower end. The middle of the second locking member body 84 is provided with the second locking member mounting shaft 80, both ends of which are pivotally connected to the circuit breaker housing, respectively. The lower end of the second locking member body 84 is drivingly cooperated with the second activated protrusion 94, and the second locking member activated protrusion 83 is arranged at the edge of one side of the lower end of the second locking member body 84 (as shown in FIG. 10, the second locking member activated protrusion 83 is arranged at the edge of the left side of the lower end of the second locking member body 84). The second protrusion 82 protrudes below the lower end of the second locking member body 84 and is connected with the second locking member activated protrusion 83 (As shown in FIG. 10, the second locking member activated portion 81 and the second locking member body 84 integrally form a L-shaped structure, and the second locking member activated protrusion 83 and the second protrusion 82 are an integral plate structure, and positioned in their entirety on the left side of the above-mentioned L-shaped structure, and the upper end is the second locking member activated protrusion 83 connected with the lower end of the second locking member body 84, and the lower end is the second protrusion 82 protruding below the lower end of the second locking member body 84). The second locking member activated portion 81 and the second protrusion 82 protrude toward both sides of the second locking member body 84, respectively, the second locking member activated portion 81 and the second locking member activated protrusion 83 protrude toward the identical side of the second locking member body 84, and the second protrusion 82 is drivingly cooperated with the first activated protrusion 91.

Preferably, as shown in FIGS. 10-13 and 17-18, the indicating member 7 includes the indicator body 7-0, the indicator horizontal arm 74, the indicator tracking shaft 75, the indicator sliding stand 72, the make-contact indicating surface 70 and the break-contact indicating surface 71. The indicator horizontal arm 74 is arranged on one end of the indicator body 7-0 and crookedly connected with the indicator body 7-0, the make-contact indicating surface 70 and the break-contact indicating surface 71 are arranged side by side on the other end of the indicator body 7-0, two indicator sliding stands 72 are respectively arranged on both sides of the middle part of the indicator body 7-0. Further, as shown in FIG. 12, the indicating member 7 further includes the indicator vertical arm 73, wherein the indicator vertical arm 73 and the indicator horizontal arm 74 are arranged on the identical end of the indicator body 70, both have a L-shaped structure in their entirety, thus the indicator vertical arm 73 helps to improve the structural strength of the indicator horizontal arm 74.

Specifically, as shown in FIGS. 12 and 13, the make-contact indicating surface 70 and the break-contact indicating surface 71 are arranged side by side on the upper end surface of the indicator body 7-0. The indicator horizontal arm 74, the indicator tracking shaft 75 and the indicator vertical arm 73 are all arranged on the lower end surface of the indicator body 7-0. The indicator horizontal arm 74 and the indicator vertical arm 73 are arranged on the identical side of the indicator body 7-0 in a L-shaped structure as a whole, and the indicator tracking shaft 75 is arranged on the other side of the indicator body 7-0. Two indicator sliding stands 72 are respectively arranged on the middle parts of both sides of the indicator body 7-0, and both positioned between the break-contact indicating surface 71 and the indicator horizontal arm 74.

As shown in FIG. 10, the circuit breaker housing is provided with an indicator tracking groove fitting with the indicator tracking shaft 75. The indicator tracking groove is obliquely arranged as an tracking groove inclined from the upper right end to the lower left end. Further, as shown in FIG. 10, the indicator tracking groove includes a first vertical groove, an inclined groove and a second vertical groove, wherein the lower end of the first vertical groove is connected with the upper right end of the inclined groove, the upper end of the second vertical groove is connected with the lower left end of the inclined groove, and the lower end of the first vertical groove is higher than the upper end of the second vertical groove. Further, as shown in FIG. 10, the indicator tracking groove is composed of two inclined half-grooves fitting with each other, in particular, one inclined half-groove is arranged on the rear cover 1*a*, and the other inclined half-groove is arranged on the base 1*b*.

Preferably, as shown in FIG. 10, the operating button 1*d* includes the button body 10*d* and the button cap arranged at one end of the button body 10*d*, wherein the middle of the button cap is provided with the indicating hole 12*d*, the middle of the other end of the button body 10*d* is provided with the indicator slot, two side walls of the indicator slot are respectively provided with one indicator groove 100*d*. Further, as shown in FIG. 10, the operating button 1*d* further includes the button connecting stand 11*d* rotatably connected to one end of the U-shaped connecting rod 35.

We will described the operating principle of the locking mechanism in combination with FIGS. 16-18 as follows:

As shown in FIG. 16, when the plug-in circuit breaker is in a break-contact state, the operating button 1*d* actuates the second locking member 8 to rotate clockwise through the fit between the indicator horizontal arm 74 of the indicating member 7 and the second locking member activated portion 81 of the second locking member 8, thus the second protrusion 82 of the second locking member 8 is moved inside the circuit breaker housing, in this state (break-contact), the plug-in circuit breaker can be installed into the circuit breaker assembling position (eg, a cabinet). As shown in FIG. 18, when the plug-in circuit breaker is in a break-contact state, continuing to pull the operating button 1*d* actuates the second locking member 8 to continue to rotate clockwise through the fit between the indicator horizontal arm 74 of the indicating member 7 and the second locking member activated portion 81 of the second locking member 8, so that the lower end of the second locking member body 84 and the second protrusion 82 of the second locking member 8 drive the second activated protrusion 94 and the first activated protrusion 91, respectively, so as to move the first protrusion 90 of the first locking member 9 inside the circuit breaker housing, thereby releasing the limit fit between the plug-in circuit breaker and the housing of the circuit breaker assembling position and ensuring the plug-in circuit breaker to be disassembled from the circuit breaker assembling position. As shown in FIG. 17, when the plug-in circuit breaker is in the make-contact state, the operating button 1*d* drives the indicator horizontal arm 74 to move down, thus the indicator horizontal arm 74 drives the second locking member 8 to rotate counterclockwise by the second locking member activated protrusion 83, so that the second protrusion 82 protrudes outside the circuit breaker housing, in this state (make-contact), the second protrusion 82 protrudes outside the circuit breaker housing. As the second locking member activated protrusion 83 is confined by the indicator horizontal arm 74, the second protrusion 82 cannot be pressed into the circuit breaker housing, so when the plug-in circuit breaker is in the make-contact state, it cannot be assembled to the circuit breaker assembling position. When the plug-in circuit breaker is switched between the break-contact state and the make-contact state, due to the fit between the indicator tracking shaft 75 and the indicator tracking groove, the indicating member 7 will also move back and forth in the indicator slot of the operating button 1*d*. Thus, when the plug-in circuit breaker is in the make-contact state, the make-contact indicating surface 70 is opposite to the indicating hole 12*d* (preferably, the indicator tracking shaft 75 is positioned at the connection between the second vertical groove and the inclined groove); when the plug-in circuit breaker is in the break-contact state, the break-contact indicating surface 70 is opposite to the indicating hole 12*d* (preferably, at this time, the indicator tracking shaft 75 is positioned at the connection between the first vertical groove and the inclined groove, and if the operating button 1*d* is continuously pulled, the indicator tracking shaft 75 slides along the first vertical groove to the second locking member 8, so as to actuate the first locking member 9 to release the limit fit with the housing of the circuit breaker assembling position).

The present invention also relates to a connecting terminal.

As shown in FIGS. 19-24, there is an embodiment of the connecting terminal of the present invention.

The connecting terminal of the present invention includes the connecting screw 2*e*, the wire-clamping piece 2*g*, the nut piece 2*f* and the connecting board 2*j*; the connecting screw 2*e* and the nut piece 2*f* are threadedly connected with each other; the wire-clamping piece 2*g* is arranged between the nut piece 2*f* and the nut of the connecting screw, and obliquely arranged with respect to the connecting board 2*j*, which is fixedly arranged. The wire-clamping piece 2*g* has one end confined, and the other end configured to from a space for connecting wires with respect to the connecting board 2*j*. During inserting wires between the wire-clamping piece 2*g* and the connecting board 2*j*, screwing the connecting screw 2*e* and moving the nut piece 2*f* in the axial direction of the connecting screw 2*e*, the nut piece 2*f* actuates the end of the wire-clamping piece 2*g* fitting with the connecting board 2*j* to rise, so as to press the wires between the wire-clamping piece 2*g* and the connecting board 2*j*. Further, the nut piece 2*f* is in limit fit with the terminal assembling cavity receiving the connecting terminal, preventing the nut piece 2*f* from rotating and enabling it to move in axial direction of the connecting screw 2*e*, thus during screwing the connecting screw 2*e*, the nut piece 2*f* reciprocates in the axial direction of the connecting screw 2*e*.

Specifically, as shown in FIGS. 19-24, the wire-clamping piece 2*g* has the left end confined, the right end arranged opposite to and fitting with the connecting board 2*j*, the wire-clamping piece 2*g* is gradually inclined downward from the left end to the right end with its left end higher than its right end. During screwing the connecting screw 2*e*, moving up the nut piece 2*f* in axial direction of the connecting screw 2*e*, the nut piece 2*f* actuates the right end of the wire-clamping piece 2*g* to gradually rise, so as to press wires between the wire-clamping piece 2*g* and the connecting board 2*j*. Of course, when required to remove the wires, the connecting screw 2*e* needs to be screwed, so that the nut piece 2*f* moves down in axial direction of the connecting screw 2*e*, thus reducing the pressure between the wire-clamping piece 2*g* and the wires helps to better remove the wires.

Preferably, as shown in FIGS. 19-24, one side of the connecting board 2*j* facing the wire-clamping piece 2*g* is provided with a plurality of lateral grooves or lateral ribs arranged side by side, and the extension direction of the lateral grooves or lateral ribs is perpendicular to the insertion direction of the wires.

In the connecting terminal of the present invention, the pressure applied by the wire-clamping piece 2*g* on the wires between the wire-clamping piece 2*g* and the connecting board 2*j* mainly includes the pressure generated by the deformation of the wire-clamping piece 2*g* itself and the pressure applied by the nut piece 2*f* on the wires via the wire-clamping piece 2*g*. Compared with the existing connecting terminal that only hinges on the wire-clamping piece 2*g* to press the wire, such connecting wires is more reliable.

It should be pointed out that, in the connecting terminal of this embodiment, the nut piece 2*f* may not be in limit fit with the terminal assembling cavity receiving the connecting terminal, only hinging on the friction force generated by the contact between the nut piece 2*f* and the wire-clamping piece 2*g*, so as to limit the rotation of the nut piece 2*f* with the connecting screw 2*e*. In addition, as the nut piece 2*f* is a special-shaped part with its gravity center positioned at one end of the nut piece 2*f* not coinciding with the axis of the connecting screw 2*e*, an eccentric force is generated to restrict the nut piece 2*f* from rotating with the connecting screw 2*e*. In addition, for the connecting terminal of this embodiment, the nut piece 2*f* and the connection screw 2*e* may also be fixedly connected (instead of thread connection) with each other, and the connecting screw 2*e* is in thread fit with the housing of the terminal assembling cavity. During screwing the connecting screw 2*e* and moving the connecting screw 2*e* with respect to the terminal assembling cavity, the nut piece 2*e* is actuated to move, equally actuating the wire-clamping piece 2*g*.

Figure 19:
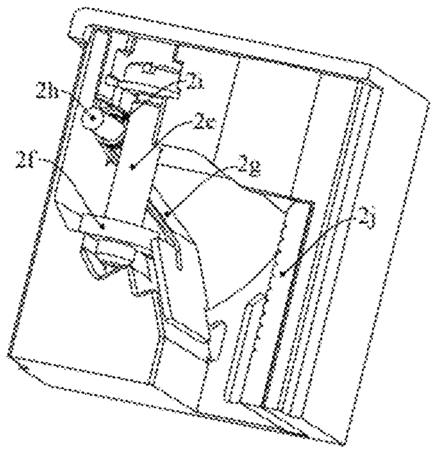
FIG. 19 is a structure view of the connecting terminal in the first embodiment of the present invention.
Figure 20:
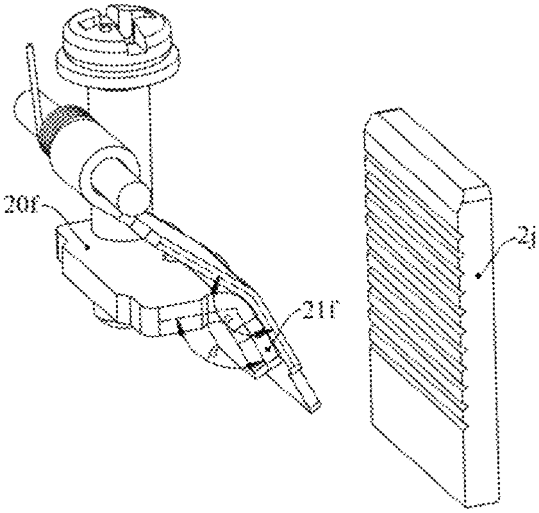
FIG. 20 is another structure view of the connecting terminal in the first embodiment of the present invention.
Figure 21:
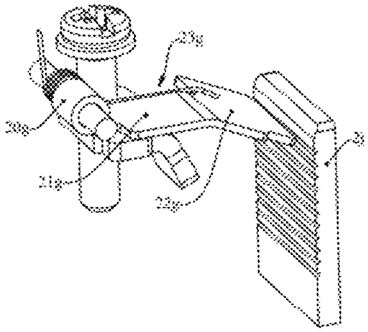
FIG. 21 is yet another structure view of the connecting terminal in the first embodiment of the present invention.

As shown in FIGS. 19-21, there is the first embodiment of the connecting terminal of the present invention.

The connecting terminal of the present invention includes the connecting screw 2*e*, the wire-clamping piece 2*g*, the nut piece 2*f*, the connecting board 2*j*, the clamping piece-mounting shaft 2*h* and the clamping piece-resetting spring 2*i*; the connecting screw 2*e* and the nut piece 2*f* are threadedly connected with each other; the nut piece 2*f* is in limit fit with the terminal assembling cavity receiving the connecting terminal, preventing the nut piece 2*f* from rotating, thus during screwing the connecting screw 2*e*, the nut piece 2*f* reciprocates in the axial direction of the connecting screw 2*e*; the wire-clamping piece 2*g* is arranged between the nut piece 2*f* and the nut of the connecting screw, and obliquely arranged with respect to the connecting board 2*j*, which is fixedly arranged. The wire-clamping piece 2*g* has one end provided with the clamping piece shaft sleeve 20*g*, and the other end arranged opposite to and fitting with the connecting board 2*j*. The clamping piece shaft sleeve 20*g* encircles the clamping piece-mounting shaft 2*h*, both ends of which are respectively fixed on the cavity wall of the terminal assembling cavity. The clamping piece-resetting spring 2*i* encircles the clamping piece-mounting shaft 2*h*, and has one end connected with the cavity wall of the terminal assembling cavity, and other end connected with the wire-clamping piece 2*g*. In the connecting terminal of this embodiment, the clamping piece-resetting spring 2*i* can actuate the turnup end of the wire-clamping piece 2*g* to fall while the nut piece 2*f* moves down, improving the efficiency and convenience of wire removal.

Specifically, as shown in FIGS. 19-21, the wire-clamping piece 2*g* has the left end provided with the clamping piece shaft sleeve 20*g*, and the right end arranged opposite to and fitting with the connecting board 2*j*, the wire-clamping piece 2*g* is gradually inclined downward from the left end to the right end with its left end higher than its right end. As shown in FIG. 20, the gap between the right end of the wire-clamping piece 2*g* and the connecting board 2*j* is the largest, thus wires can be inserted between the wire-clamping piece 2*g* and the connecting board 2*j*, then screwing the connecting screw 2*e* enables the nut piece 2*f* to moves up in axial direction of the connecting screw 2*e*. During gradually raising the right end of the wire-clamping piece 2*g* with gradual reduction of the gap between the right end of the wire-clamping piece 2*g* and the connecting board 2*j*, the wires are pressed tightly. As shown in FIG. 21, the gap between the right end of the wire-clamping piece 2*g* and the connecting board 2*j* is the smallest, even almost zero.

Preferably, as shown in FIG. 21, the wire-clamping piece 2*g* includes the wire-clamping piece sleeve 20*g*, the first connecting portion 21*g* and the first wire-clamping portion 22*g*, wherein the first connecting portion 21*g* has one end connected with the wire-clamping piece sleeve 20*g*, and the other end crookedly connected with one end of the first wire-clamping portion 22*g*, and the other end of the first wire-clamping portion 22*g* fits with the connecting board 2*j*. Specifically, as shown in FIG. 21, the first connecting portion 21*g* has the left end connected with the wire-clamping piece sleeve 20*g*, and the right end crookedly connected with the left end of the first wire-clamping portion 22*g*, and the right end of the first wire-clamping portion 22*g* is arranged opposite to and fits with the connecting board 2*j*. Further, as shown in FIGS. 19-21, the wire-clamping piece 2*g* has a L-shaped structure as a whole, the width of the first wire-clamping portion 22*g* is greater than the width of the first connecting portion 21*g*, and the length of the wire-clamping piece sleeve 20*g* is equal to the width of the first connecting portion 21*g*. The connecting screw 2*e* is arranged at the notch of the L-shaped structure of the wire-clamping piece 2*g*.

Preferably, as shown in FIG. 20, the nut piece 2*f* includes the first nut portion 20*f* threadedly connected with the connecting screw 2*e*, and the second nut portion 21*f* crookedly connected with one end of the first nut portion 20*f*, wherein the first nut portion 20*f* is arranged opposite to and fits with the first connecting portion 21*g*, and the second nut portion 21*f* is arranged opposite to and fits with the first wire-clamping portion 22*g*. Specifically, as shown in FIGS. 19-20, in the initial state, the second nut portion 21*f* is contiguously connected with the first wire-clamping portion 22*g* (both are substantially parallel to each other), and the right end of the first nut portion 20*f* is contiguously connected with the right end of the first connecting portion 21*g*. As shown in FIG. 21, after screwing the connecting screw 2*e*, the second nut portion 21*f* actuates the first wire-clamping portion 22*g* to gradually rise, meanwhile the second nut portion 21*f* is gradually separated from the first wire-clamping portion 22*g*, then coordinating the first nut portion 20*f* with the first connecting portion 21*g* actuates the first wire-clamping portion 22*g* to continue to rise.

Preferably, as shown in FIG. 20, the included angle α between the first connecting portion 21*g* and the first wire-clamping portion 22*g* is greater than the included angle β between the first nut portion 20*f* and the second nut portion 21*f*.

Figure 22:
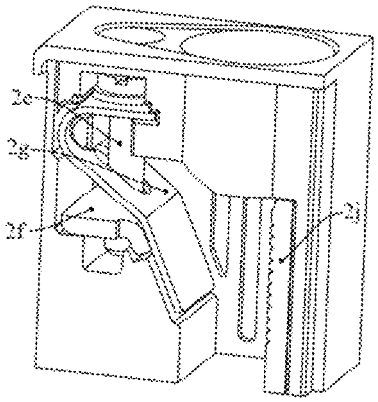
FIG. 22 is a structure view of the connecting terminal in the second embodiment of the present invention.
Figure 23:
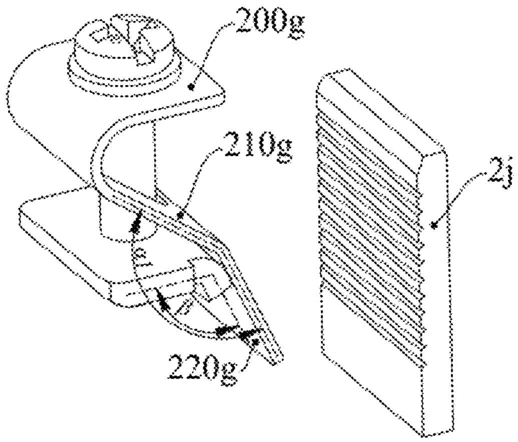
FIG. 23 is another structure view of the connecting terminal in the second embodiment of the present invention.
Figure 24:
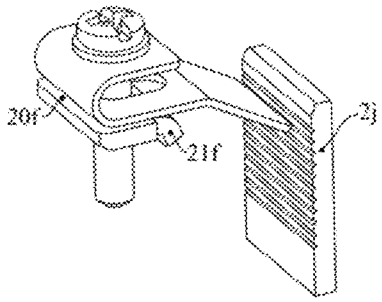
FIG. 24 is yet another structure view of the connecting terminal in the second embodiment of the present invention.

As shown in FIGS. 22-24, there is the second embodiment of the connecting terminal of the present invention.

The connecting terminal of the present invention includes the connecting screw 2*e*, the wire-clamping piece 2*g*, the nut piece 2*f* and the connecting board 2*j*; the connecting screw 2*e* and the nut piece 2*f* are threadedly connected with each other; the nut piece 2*f* is in limit fit with the terminal assembling cavity receiving the connecting terminal, preventing the nut piece 2*f* from rotating, thus during screwing the connecting screw 2*e*, the nut piece 2*f* reciprocates in the axial direction of the connecting screw 2*e*; the wire-clamping piece 2*g* is arranged between the nut piece 2*f* and the nut of the connecting screw, and obliquely arranged with respect to the connecting board 2*j*, which is fixedly arranged. The wire-clamping piece 2*g* has one end confined, and the other end arranged opposite to and fitting with the connecting board 2*j*. During inserting wires between the wire-clamping piece 2*g* and the connecting board 2*j*, screwing the connecting screw 2*e* and moving the nut piece 2*f* in the axial direction of the connecting screw 2*e*, the nut piece 2*f* actuates the end of the wire-clamping piece 2*g* fitting with the connecting board 2*j* to rise, so as to press the wires between the wire-clamping piece 2*g* and the connecting board 2*j*.

Preferably, as shown in FIGS. 22-24, the wire-clamping piece 2*g* includes the first wire-clamping portion 200*g*, the second wire-clamping portion 210*g* and the third wire-clamping portion 220*g*. The first wire-clamping portion 200*g* encircles the connecting screw 2*e* through the first opening arranged on it. The second wire-clamping portion 210g is provided with the second opening, through which the second wire-clamping portion 210g encircles the connecting screw 2e. One end of the first wire-clamping portion 200g is crookedly connected with one end of the second wire-clamping portion 210g; the other end of the second wire-clamping portion 210g is crookedly connected with one end of the third wire-clamping portion 220g; the other end of the third wire-clamping portion 220g fits with the connecting board 2j; the second wire-clamping portion 210g and the third wire-clamping portion 220g are integrally arranged obliquely with respect to the connecting board 2j. The nut piece 2f includes the first nut portion 20f threadedly connected with the connecting screw 2e, and the second nut portion 21f crookedly connected with one end of the first nut portion 20f, wherein the first nut portion 20f is arranged opposite to and fits with the second wire-clamping portion 210g, and the second nut portion 21f is arranged opposite to and fits with the third wire-clamping portion 220g. Further, as shown in FIG. 23, the connection between the first wire-clamping portion 200g and the second wire-clamping portion 210g is an arc structure, and the included angle α1 between the second wire-clamping portion 210g and the third wire-clamping portion 220g is greater than the included angle β between the first nut portion 20f and the second nut portion 21f.

Specifically, as shown in FIGS. 22-24, the first wire-clamping portion 200g and the second wire-clamping portion 210g are sequentially arranged between the nut of the connecting screw 2e and the nut piece 2f. The left end of the third wire-clamping portion 220g is crookedly connected with the right end of the second wire-clamping portion 210g, and the right end of the third wire-clamping portion 220g is arranged opposite to and fits with the connecting board 2j. As shown in FIGS. 22 and 23, there is no or weak interaction force between the nut of the connecting screw 2e and the first wire-clamping portion 200g, and between the third wire-clamping portion 220g and the second nut portion 21f. As shown in FIG. 24, there is strong interaction force between the nut of the connecting screw 2e and the first wire-clamping portion 200g, and between the third wire-clamping portion 220g and the second nut portion 21f (because the connection between the first wire-clamping portion 200g and the second wire-clamping portion 210g is compressed). Screwing the connecting screw 2e to move the nut piece 2f downwards enables the connection between the first wire-clamping portion 200g and the second wire-clamping portion 210g in the compressed state to gradually relax, so that the third wire-clamping portion 220g gradually moves down, facilitating the wire removal of the connecting terminal.

As shown in FIGS. 25-30, there is another embodiment of the connecting terminal of the present invention.

The connecting terminal of the present invention includes the connecting screw 2e, the wire-clamping piece 2g, the clamping piece-mounting shaft 2h, the nut piece 2f and the connecting board 2j; the connecting screw 2e and the nut piece 2f are threadedly connected with each other; the wire-clamping piece 2g includes the upper wire-clamping piece 2g1 and the lower wire-clamping piece 2g2 arranged opposite to each other; the upper wire-clamping piece 2g1 and the lower wire-clamping piece 2g2 are obliquely arranged with respect to the connecting board 2j; the connection between one end of the upper wire-clamping piece 2g1 and one end of the lower wire-clamping piece 2g2 encircles the clamping piece-mounting shaft 2h; the free end of the upper wire-clamping piece 2g1 and the free end of the lower wire-clamping piece 2g2 are both arranged opposite to and fits with the connecting board 2j. During inserting wires between the wire-clamping piece 2g and the connecting board 2j, screwing the connecting screw 2e and moving the nut piece 2f in the axial direction of the connecting screw 2e, the nut piece 2f actuates the end of the wire-clamping piece 2g fitting with the connecting board 2j to rise, so as to press the wires between the wire-clamping piece 2g and the connecting board 2j. Further, the wire-clamping piece 2g is in limit fit with the connecting screw 2e to prevent the connecting screw 2e from moving away from the connecting board 2j. Further, the nut piece 2f is limited to prevent itself from rotating, and screwing the connecting screw 2e actuates the nut piece 2f to move back and forth in the axial direction of the connecting screw 2e.

Figure 26:
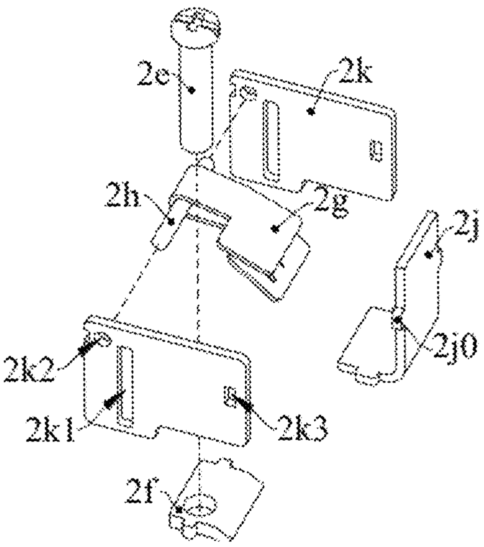
FIG. 26 is an exploded view of the connecting terminal in the third embodiment of the present invention.
Figure 27:
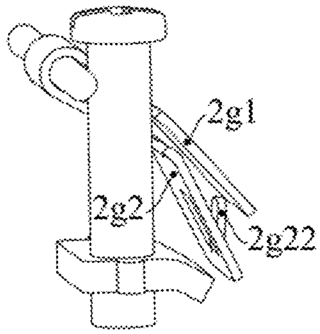
FIG. 27 is a structure view of the connecting terminal in the third embodiment of the present invention, showing at least the positional relation and connection relation of the terminal screw, the nut piece, the wire-clamping piece and the clamping piece-mounting shaft.
Figure 29:
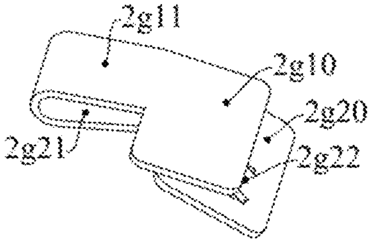
FIG. 29 is a structure view of the wire-clamping piece of the connecting terminal in the third embodiment of the present invention.
Figure 30:
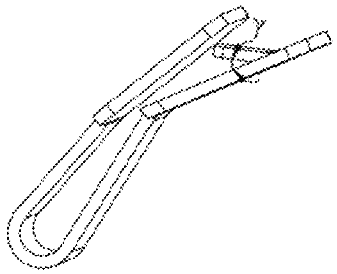
FIG. 30 is another structure view of the wire-clamping piece of the connecting terminal in the third embodiment of the present invention.

Preferably, as shown in FIGS. 26, 27 and 29, the upper wire-clamping piece 2g1 and the lower wire-clamping piece 2g2 both have a L-shaped structure, wherein the upper wire-clamping piece 2g1 includes the upper connecting portion 2g11 and the upper wire-clamping portion 2g10, the upper wire-clamping portion 2g10 includes a first wire-clamping end and a first connecting end arranged at both ends thereof, the first wire-clamping end is arranged opposite to and fits with the connecting board 2j, the first connecting end is connected with one end of the upper connecting portion 2g11, the width of the first connecting end is greater than the width of the upper connecting portion 2g11; the lower wire-clamping piece 2g2 includes the lower connecting portion 2g21 and the lower wire-clamping portion 2g20, the lower wire-clamping portion 2g20 includes a second wire-clamping end and a second connecting end arranged at both ends thereof, the second wire-clamping end is arranged opposite to and fits with the connecting board 2j, the second connecting end is connected with one end of the lower connecting portion 2g21, the width of the second connecting end is greater than the width of the lower connecting portion 2g21, the other end of the lower connecting portion 2g21 is connected with the other end of the upper connecting portion 2g11; the first wire-clamping end protrudes from the second wire-clamping end in the diection of the connecting board 2j, and the second connecting end protrudes from the first connecting end in the direction of the connecting screw 2e.

Specifically, as shown in FIG. 27, the right end of the upper wire-clamping portion 2g10 and the right end of the lower wire-clamping portion 2g20 are arranged opposite to and fit with the connecting board 2j, respectively, the right end of the lower wire-clamping portion 2g20 protrudes from the right end of the upper wire-clamping portion 2g10 in the direction (to the right side) of the connecting board 2j, and the left end of the lower wire-clamping portion 2g20 protrudes from the left end of the upper wire-clamping portion 2g10 in the direction (to the left side) of the connecting board 2j. The connecting screw 2e is arranged between the clamping piece-mounting shaft 2h and the upper wire-clamping portion 2g10 (and is positioned between the clamping piece-mounting shaft 2h and the lower wire-clamping portion 2g20). The connecting screw 2e is screwed to move upwards the nut piece 2f, meanwhile the rights end of the lower wire-clamping portion 2g20 and the upper wire-clamping portion 2g10 are actuated to rise to press the wires. If the outer diameter of the wires is relatively thin, only the lower wire-clamping portion 2g20 can press the wires tightly, and if the outer diameter of the wires is large, the lower wire-clamping portion 2g20 in coordination with the upper wire-clamping portion 2g10 can press the wires tightly, thereby improving the connection reliability of the connecting terminal of the invention, and enabling the connecting terminal to be suitable for the connection operation of the wires with various external diameters.

Preferably, as shown in FIG. 27, the lower wire-clamping piece 2*g*2 further includes the disconnecting elastic piece 2*g*22 arranged at the middle of the lower wire-clamping portion 2*g*20, the disconnecting elastic piece 2*g*22 has one end connected with the lower wire-clamping portion 2*g*20, and the other end arranged opposite to and fitting with the upper wire-clamping portion 2*g*10. Further, as shown in FIG. 27, the included angle γ between the disconnecting elastic piece 2*g*22 and the lower wire-clamping portion 2*g*20 is less than 90°. When there is a need to disconnect the wires from the wiring terminal of the present invention, the connecting screw 2*e* is screwed to move downwards the nut piece 2*f*, thus the disconnecting elastic piece 2*g*22 can provide an elastic force to release the wires from the lower wire-clamping portion 2*g*20, thereby improving the convenience and efficiency of disconnection.

Figure 25:
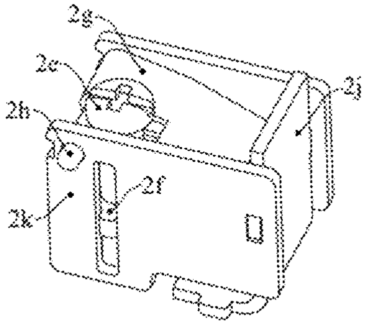
FIG. 25 is an assembly view of the connecting terminal in the third embodiment of the present invention.
Figure 28:
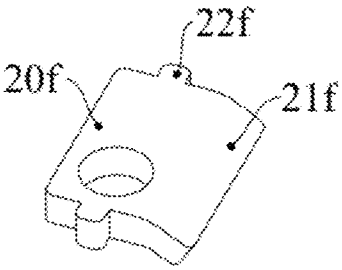
FIG. 28 is a structure view of the nut piece of the connecting terminal in the third embodiment of the present invention.

Preferably, as shown in FIGS. 25, 26 and 28, the connecting terminal of the present invention further includes two fixing plates 2*k* arranged opposite to each other, between which the connecting screw 2*e*, the nut piece 2*f*, the wire-clamping piece 2*g* and the connecting board 2*j* are all arranged, and which confine the nut piece 2*f*, preventing the nut piece 2*f* from rotating, and the two ends of the clamping piece-mounting shaft 2*h* are connected with the two fixing plates 2*k*, respectively. Further, as shown in FIGS. 25 and 28, the fixing plate 2*k* is provided with the nut sliding groove 2*k*1, and each end of the nut piece 2*f* is provided with one nut sliding stand 22*f*, which is slidably arranged inside the two nut sliding grooves 2*k*1, respectively. Further, as shown in FIG. 26, the fixing plates 2*k* is further provided with the connecting board limiting hole 2*k*3, and one connecting board limiting stand 2*j*0 is arranged along each edge in pair of the connecting board 2*j*, thus two connecting board limiting stand 2*j*0 are respectively arranged inside two connecting board limiting hole 2*k*3.

As shown in FIGS. 25 and 26, two ends of the clamping piece-mounting shaft 2*h* are respectively connected with the upper portions of one end of two fixing plates 2*k*, in particular, the two ends of the clamping piece-mounting shaft 2*h* are respectively connected with the upper left corner of the two fixing plates 2*k*. The connecting board 2*j* is arranged between the other ends of the two fixing plates 2*k*, in particular, and two ends of the connecting board 2*j* are respectively connected with the right ends of the two fixing plates 2*k*. The wire-clamping piece 2*g* has one end connected with the clamping piece-mounting shaft 2*h*, and the other end arranged opposite to and fitting with the connecting board 2*j*, and the wire-clamping piece 2*g* is inclined downwards from one end connected with the clamping piece-mounting shaft 2*h* to the other end, in particular the wire-clamping piece 2*g* is gradually inclined downwards from the left end to the right end. The wire-clamping piece 2*g* is integrally formed into a L-shaped structure, and the connecting screw 2*e* is arranged at the notch of the L-shaped structure of the wire-clamping piece 2*g* and in threaded fit with the nut piece 2*f* arranged under the wire-clamping piece 2*g*, in particular, the connecting screw 2*e* is arranged on the front side of the upper connecting portion 2*g*11 (the lower connecting portion 2*g*21) and positioned at the left side of the upper wire-clamping portion 2*g*10 (the lower wire-clamping portion 2*g*20).

Preferably, one side of the connecting board 2*j* facing the wire-clamping piece 2*g* is provided with a plurality of lateral grooves or lateral ribs arranged side by side, and the extension direction of the lateral grooves or lateral ribs is perpendicular to the insertion direction of the wires.

When it is to be noted that the connecting terminal of the present invention is suitable to the plug-in circuit breaker of the present invention, the first wire-outlet terminal 11 and the second wire-outlet terminal 10 of the plug-in circuit breaker can employ the connecting terminal of the present invention, thereby improving connection efficiency and connection reliability. Further, the circuit breaker housing is further provided with an auxiliary disconnecting hole, each wire-outlet terminal correspondingly fits with one auxiliary disconnecting hole, and the auxiliary disconnecting hole is arranged on one side of the connecting screw 2*e* and opposite to the wire-clamping piece 2*g*. Further, the auxiliary disconnecting hole is arranged opposite to one end of the wire-clamping piece 2*g* fitting with the connecting board 2*j*. When the wire-clamping piece 2*g* cannot automatically release the wires, the auxiliary disconnecting hole presses the wire-clamping piece 2*g*, so that the wire-clamping piece 2*g* releases the wires, thereby improving disconnection efficiency.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A plug-in circuit breaker comprising a circuit breaker housing and an operating button, one end of said operating button inserted inside the circuit breaker housing being a button inner end, and the other end of said operating button protruding outside the circuit breaker housing being a button outer end;

wherein an indicator slot is arranged inside said operating button, an indicating hole is arranged on said button outer end, and said indicating hole communicates with said indicator slot; the plug-in circuit breaker further includes an indicating member, one end of which is provided with a make-contact indicating surface and a break-contact indicating surface both respectively fitting with said indicating hole;

when the plug-in circuit breaker is in a break-contact state, said break-contact indicating surface is arranged opposite to said indicating hole, thus during pressing said operating button to move it toward the make-contact position, said indicating member moves inside said indicator slot, after the plug-in circuit breaker enters the make-contact state, said make-contact indicating surface is arranged opposite to said indicating hole, thus during pulling said operating button to move it toward the break-contact position, said indicating member moves inside said indicator slot, after the plug-in circuit breaker enters the break-contact state, said break-contact indicating surface is arranged opposite to said indicating hole.

2. The plug-in circuit breaker according to claim 1, wherein the movement direction of said operating button is perpendicular to the movement direction of said indicating member within said indicator slot.

3. The plug-in circuit breaker according to claim 1, wherein an indicator tracking shaft is arranged on said indicating member, an indicator tracking groove is arranged on the circuit breaker housing, said indicator tracking groove is an oblique tracking groove, said indicator tracking shaft is slidably arranged in the indicator tracking groove; when pressing/pulling said operating button, said indicator tracking groove drives said indicating member to move in its entirety in said indicator slot by said indicator tracking shaft, so that said make-contact indicating surface/break-contact indicating surface is arranged opposite to said indicating hole.

4. The plug-in circuit breaker according to claim 3, wherein said indicator tracking groove is formed by means of the fit between two inclined half-grooves arranged opposite to each other on the circuit breaker housing; when the plug-in circuit breaker is in the break-contact state, said indicator tracking shaft is positioned at one end of said indicator tracking groove, which is a first tracking groove end; when the plug-in circuit breaker is in the make-contact state, said indicator tracking shaft is positioned at the other end of said indicator tracking groove, which is a second tracking groove end, said first tracking groove end is closer to the button outer end of said operating button than said second tracking groove end.

5. The plug-in circuit breaker according to claim 1, wherein said operating button further includes an indicator sliding groove respectively arranged on a pair of side walls of said indicator slot, the extension direction of said indicator sliding groove is perpendicular to the movement direction of said operating button; said indicating member further includes two indicator sliding stands respectively arranged on a pair of side surfaces thereof, said indicator sliding stands are slidably arranged in said indicator sliding grooves.

6. The plug-in circuit breaker according to claim 1, wherein the plug-in circuit breaker further includes a locking mechanism, said locking mechanism includes a second locking member pivotally arranged, said second locking member includes a locking member upper end and a locking member lower end respectively arranged at both ends thereof; said locking member lower end is provided with a second protrusion; when the plug-in circuit breaker is in the make-contact state, said operating button actuates said second locking member to rotate by said locking member lower end, so that said second protrusion protrudes outside the circuit breaker housing; when the plug-in circuit breaker is in the break-contact state, said operating button actuates said second locking member to rotate by said locking member upper end, so that said second protrusion moves into the circuit breaker housing.

7. The plug-in circuit breaker according to claim 6, wherein said indicating member further includes an indicator horizontal arm arranged at one end thereof, said second locking member further includes a second locking member activated portion arranged at said locking member upper end, said operating button are drivingly cooperated with said second locking member activated portion by said indicator horizontal arm to drive said second locking member to rotate, so that said second protrusion moves into the circuit breaker housing.

8. The plug-in circuit breaker according to claim 7, wherein said second locking member further includes a second locking member activated protrusion arranged at said locking member lower end, said second locking member activated protrusion protudes in the reverse direction of said second protrusion; when the plug-in circuit breaker is in the make-contact state, said indicator horizontal arm is positioned on one side of said second locking member activated protrusion and in limit fit with it, so as to keep said second protrusion protruding outside the circuit breaker housing.

9. The plug-in circuit breaker according to claim 6, wherein said locking mechanism further includes a first locking member, which has one end slidably arranged inside the circuit breaker housing, and the other end being a first protrusion protuding outside the circuit breaker housing; when the plug-in circuit breaker is assembled to a cavitated circuit breaker assembling position, the housing of the circuit breaker assembling position presses said first protrusion, so that said first locking member moves in its entirety to the inside of the circuit breaker housing, after the plug-in circuit breaker has been assembled to reach the designated position in, said first protrusion protrudes outside the circuit breaker housing and is in limit fit with the housing of the circuit breaker assembling position.

10. The plug-in circuit breaker according to claim 9, wherein the locking member lower end of said second locking member is drivingly cooperated with said first locking member, when the plug-in circuit breaker is in the break-contact state, pulling said operating button actuates said first locking member to move in its entirety toward the inside of the circuit breaker housing by said second locking member, so as to release the limit fit between said first protrusion and the housing of the circuit breaker assembling position.

11. The plug-in circuit breaker according to claim 10, wherein said first locking member further includes a first sliding end slidably arranged inside the circuit breaker housing, said first sliding end has one side connected with said first protrusion, and the other side connected with the circuit breaker housing by said first locking member resetting spring applying a force to said first locking member to keep said first protrusion protruding outside the circuit breaker housing.

12. The plug-in circuit breaker according to claim 10, wherein said first sliding end further includes a first activated protrusion and a second activated protrusion, said second locking member further includes a second locking member body pivotally arranged in the middle, said second locking member activated portion of said second locking member is crookedly connected with one end of said second locking member body, and the other end of said second locking member body is provided with said second protrusion and drivingly cooperated with said second activated protrusion, said second locking member activated portion and said second protrusion protrude toward the both sides of said second locking member body, respectively, and said second protrusion is drivingly cooperated with said first activated protrusion.

13. The plug-in circuit breaker according to claim 9, wherein said first locking member further includes a first sliding end and a first protrusion respectively arranged both end thereof, said first sliding end has one side connected with said first protrusion, and the other side connected with the circuit breaker housing by said first locking member resetting spring; one end of said first sliding end is provided with a first tracking groove fitting with a first sliding track on the circuit breaker housing; said first sliding end further includes a first activated protrusion and a second activated protrusion, said first activated protrusion and said first tracking groove are respectively arranged at both ends of said first sliding end, said second activated protrusion are arranged on the upper side of said first sliding end and positioned between said first activated protrusion and said first tracking groove.

14. The plug-in circuit breaker according to claim 6, wherein said second locking member includes a second locking member activated portion, a second locking member body, a second locking member activated protrusion, a second locking member activated protrusion and a second protrusions; said second locking member body has the middle part pivotally arranged on the circuit breaker housing by said second locking member mounting shaft, one end crookedly connected with said second locking member activated portion, and the other end provided with said second locking member activated protrusion and said second protrusions, said second locking member activated portion and said second protrusion protrude toward both sides of said second locking member body, respectively, and said second locking member activated portion and said second locking member activated protrusion both protrude on the identical side of said second locking member body.

15. The plug-in circuit breaker according to claim 1, wherein said indicating member includes an indicator body, an indicator horizontal arm, an indicator tracking shaft, an indicator sliding stand, a make-contact indicating surface and a break-contact indicating surface; said indicator horizontal arm and indicator tracking shaft are arranged on the identical end of said indicator body and positioned on the both sides of said indicator body, respectively, said indicator horizontal arm is crookedly connected with said indicator body, said make-contact indicating surface and said break-contact indicating surface are arranged side by side on the other end of said indicator body, two indicator sliding stands are respectively arranged on both sides of the middle part of said indicator body.

* * * * *